(12) United States Patent
Ogasawara et al.

(10) Patent No.: US 10,792,567 B2
(45) Date of Patent: Oct. 6, 2020

(54) TERMINAL DEVICE, SYSTEM, PROGRAM, AND METHOD

(71) Applicant: GungHo Online Entertainment, Inc., Tokyo (JP)

(72) Inventors: Hiroyuki Ogasawara, Tokyo (JP); Rie Takeuchi, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 36 days.

(21) Appl. No.: 15/994,357

(22) Filed: May 31, 2018

(65) Prior Publication Data

US 2019/0192967 A1 Jun. 27, 2019

Related U.S. Application Data

(63) Continuation of application No. PCT/JP2017/046312, filed on Dec. 25, 2017.

(51) Int. Cl.
| | |
|---|---|
| *A63F 13/525* | (2014.01) |
| *A63F 13/25* | (2014.01) |
| *A63F 13/426* | (2014.01) |
| *G06K 9/00* | (2006.01) |

(52) U.S. Cl.
CPC ............ *A63F 13/525* (2014.09); *A63F 13/25* (2014.09); *A63F 13/426* (2014.09); *A63F 2300/8082* (2013.01); *G06K 9/00362* (2013.01)

(58) Field of Classification Search
CPC ....... A63F 13/426; A63F 13/25; A63F 13/525
See application file for complete search history.

(56) References Cited

U.S. PATENT DOCUMENTS

| | | | |
|---|---|---|---|
| 6,377,277 B1 | 4/2002 | Yamamoto | |
| 7,289,130 B1 | 10/2007 | Satoh et al. | |
| 9,159,152 B1 * | 10/2015 | Glover | G06T 13/40 |

(Continued)

FOREIGN PATENT DOCUMENTS

| | | |
|---|---|---|
| JP | 3141737 B2 | 3/2001 |
| JP | 2001-195601 A | 7/2001 |

(Continued)

OTHER PUBLICATIONS

Japanese Office Action for Patent Application No. 2017-567501, dated May 14, 2019 (7 pages).

*Primary Examiner* — Jay Trent Liddle
(74) *Attorney, Agent, or Firm* — Harness, Dickey & Pierce, P.L.C.

(57) ABSTRACT

A terminal device includes an interface configured to communicate with an external device, a memory, and a processor. The memory is configured to store computer-readable instructions, a first virtual object, and a second virtual object. The first virtual object is operable based on an instruction input by a player in a real space. The processor is configured to execute the computer readable-instructions so as to: obtain a virtual space image including the first and second virtual objects, the virtual space image being virtually captured by a virtual camera in a virtual space; recognize a positional relationship between the second virtual object and one of the first virtual object and the virtual camera in the virtual space; and change a display form of the second virtual object, when the positional relationship is a predetermined positional relationship.

17 Claims, 13 Drawing Sheets

(56) References Cited

U.S. PATENT DOCUMENTS

| | | | |
|---|---|---|---|
| 2008/0043022 A1* | 2/2008 | Ishihara | A63F 13/10 345/428 |
| 2009/0241038 A1* | 9/2009 | Izuno | A63F 13/426 715/757 |
| 2010/0081506 A1* | 4/2010 | Yoshikawa | A63F 13/04 463/37 |
| 2010/0095249 A1* | 4/2010 | Yoshikawa | A63F 13/10 715/856 |
| 2011/0105228 A1* | 5/2011 | Yamada | A63F 13/06 463/31 |
| 2012/0004017 A1* | 1/2012 | Sakurai | A63F 13/5258 463/2 |
| 2012/0319950 A1* | 12/2012 | Marks | A63F 13/02 345/158 |
| 2013/0150165 A1* | 6/2013 | Takahashi | G06F 3/0488 463/37 |
| 2013/0208004 A1 | 8/2013 | Hamada | |
| 2016/0042570 A1 | 2/2016 | Hamada | |
| 2017/0109939 A1 | 4/2017 | Hamada | |
| 2018/0068488 A1* | 3/2018 | Hart | G06F 3/011 |
| 2018/0256976 A1* | 9/2018 | McHale | A63F 13/525 |

FOREIGN PATENT DOCUMENTS

| | | |
|---|---|---|
| JP | 2002-045566 A | 2/2002 |
| JP | 2013-167941 A | 8/2013 |
| JP | 2015-100481 A | 6/2015 |
| JP | 2016-122392 A | 7/2016 |
| JP | 2017-102298 A | 6/2017 |
| JP | 2017-143978 A | 8/2017 |
| JP | 2017-170106 A | 9/2017 |

* cited by examiner

| OBJECT ID | ARRANGEMENT COORDINATES | TYPE | SHAPE | DISPLAY |
|---|---|---|---|---|
| O1 | x1,y1,z1 | WALL | F1 | ON |
| O2 | x2,y2,z2 | WALL | F2 | OFF |
| O3 | x3,y3,z3 | ENEMY | F3 | ON |
| O4 | x4,y4,z4 | DOOR | F4 | ON |
| O5 | x5,y5,z5 | WEAPON | F5 | ON |
| ... | ... | ... | ... | ... |

TERMINAL DEVICE, SYSTEM, PROGRAM, AND METHOD

CROSS-REFERENCE TO RELATED APPLICATIONS

The present application is a continuation application of International Application No. PCT/JP2017/046312, filed on Dec. 25, 2017, which is expressly incorporated herein by reference in its entirety.

BACKGROUND

1. Technical Field

The present disclosure relates to a terminal device, a system, a program, and a method for displaying a player object and another virtual object that are operated on the basis of an instruction input by a player in a real space, for example.

2. Related Art

Conventionally, systems for enabling a player to operate an operation target object arranged in a virtual space in conjunction with an instruction input of the player are known. As an example, there is a system, as described in JP 2017-170106 A, in which a player mounts a head mounted display (HMD), moves with his/her own viewpoint in a virtual space displayed on a display of the head mounted display, and operates an operation target object, thereby to experience virtual reality where the player feels as if he/she exists in the virtual space.

However, in such a case, while the player can recognize the virtual space via the head mounted display, a third person is merely viewing or watching the player's operation, which cannot be said to be sufficiently attractive.

SUMMARY

Therefore, the present disclosure provides, on the basis of the above technologies, a terminal device, a system, a program, or a method for enabling display of a virtual space that is highly attractive to a third person.

According to an aspect of the present disclosure, there is provided "a terminal device comprising: a memory configured to store a computer-readable instructions, a first virtual object operable on the basis of an instruction input of a player in a real space, a second virtual object different from the first virtual object; and a processor configured to execute the computer-readable instructions so as to change, in a virtual space in which the first virtual object, the second virtual object, and a virtual camera for virtually capturing the first virtual object and the second virtual object are each virtually arranged at different positions, a display form of the second virtual object, of the first virtual object and the second virtual object comprised in a virtual space image captured by the virtual camera, in a case where the second virtual object becomes in a predetermined positional relationship with respect to at least one of the virtual camera and the first virtual object".

According to an aspect of the present disclosure, there is provided "a system comprising: the terminal device according to the above aspect; a real space camera arranged in a real space, communicatively connected with the terminal device, and configured to capture a player in the real space; and a display communicatively connected with the terminal device, and configured to display a virtual space image including the first virtual object and the second virtual object output by the processor, the second virtual object being in the changed display form".

According to an aspect of the present disclosure, there is provided "a computer program product embodying computer-readable instructions stored on a non-transitory computer-readable storage medium for causing a computer to execute a process by a processor, the computer comprising: a memory configured to store a first virtual object operable on the basis of an instruction input of a player in a real space and a second virtual object different from the first virtual object, the computer configured to perform the step of: changing, in a virtual space in which the first virtual object, the second virtual object and a virtual camera for virtually capturing the first virtual object and the second virtual object are each virtually arranged at different positions, a display form of the second virtual object, of the first virtual object and the second virtual object included in a virtual space image captured by the virtual camera, in a case where the second virtual object becomes in a predetermined positional relationship with respect to at least one of the virtual camera and the first virtual object on the basis of the instruction command".

According to an aspect of the present disclosure, there is provided "a method for causing a processor in a computer to execute a process, the computer comprising: a memory configured to store computer-readable instructions and a first virtual object operable on the basis of an instruction input of a player in a real space and a second virtual object different from the first virtual object, the method comprising executing the computer-readable instructions on the processor the step of: changing, in a virtual space in which the first virtual object, the second virtual object and a virtual camera for virtually capturing the first virtual object and the second virtual object are each virtually arranged at different positions, a display form of the second virtual object, of the first virtual object and the second virtual object included in a virtual space image captured by the virtual camera, in a case where the second virtual object becomes in a predetermined positional relationship with respect to at least one of the virtual camera and the first virtual object".

According to various embodiments of the present disclosure, a terminal device, a system, a program, or a method for enabling display of a virtual space that is highly attractive to a third person can be provided.

Note that the above-described effect is simply an example provided for illustrative purposes only, and is not restrictive for convenience of description. Any effect described in the present disclosure or an apparent effect for a person skilled in the art can be exhibited in addition to or in place of the above-described effect.

DESCRIPTION OF EXEMPLARY EMBODIMENTS

Figure 1A:
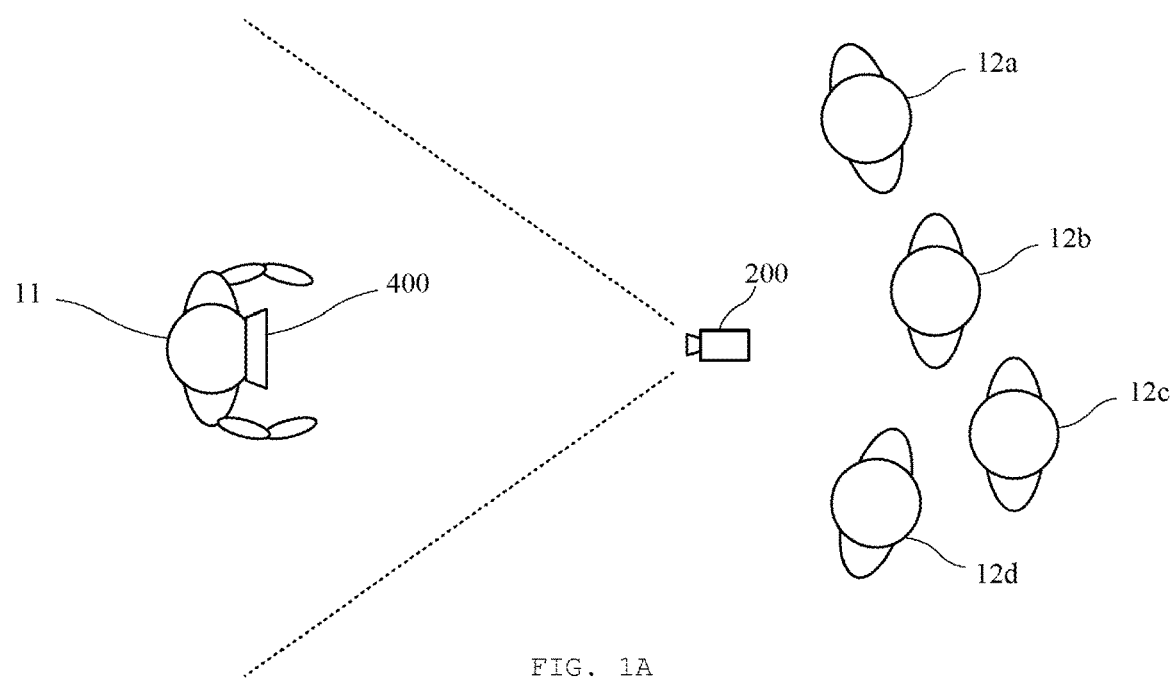
FIG. 1A is a diagram for conceptually describing a system 1 according to an embodiment of the present disclosure.

Various embodiments of the present disclosure will be described with reference to the appended drawings. Note that the configuration element common in the drawings is denoted with the same reference sign.

1. Overview of System According to Embodiment of Present Disclosure

FIG. 1A is a diagram for conceptually describing a system 1 according to an embodiment of the present disclosure. Specifically, FIG. 1A illustrates a state in which a player 11 in a real space wears a head mounted display 400 and executes a game application in a virtual space. At this time, third persons 12a to 12d who are watching the game application in execution merely see the motion of the player 11 and cannot recognize processing performed in the virtual space, which is very boring. Therefore, in the present embodiment, a real space camera 200 arranged in a real space captures a real space image including the player 11. Further, a virtual camera 600 virtually arranged in the virtual space captures a virtual space image in synchronization with the capture of the real space image. Then, an image of the player 11 in the captured real space image and at least a part in the captured virtual space image are composited and displayed on a display 300. As a result, the third persons 12a to 12d can view how the player 11 moves and operates the operation target object in the virtual space of the game application in execution with realistic sensation.

Figure 1B:
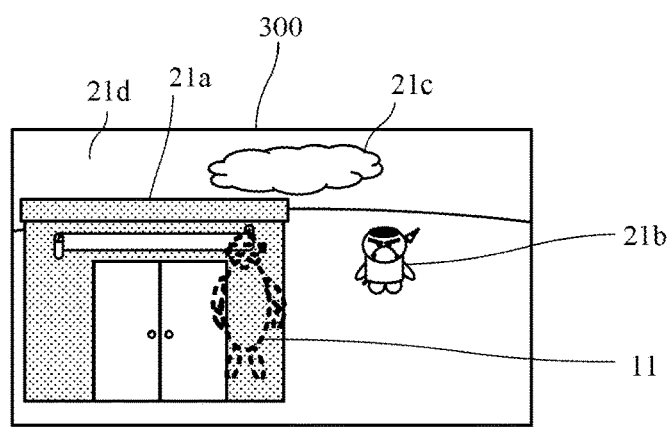
FIG. 1B is a diagram for conceptually describing the system 1 according to an embodiment of the present disclosure. Further.
Figure 1C:
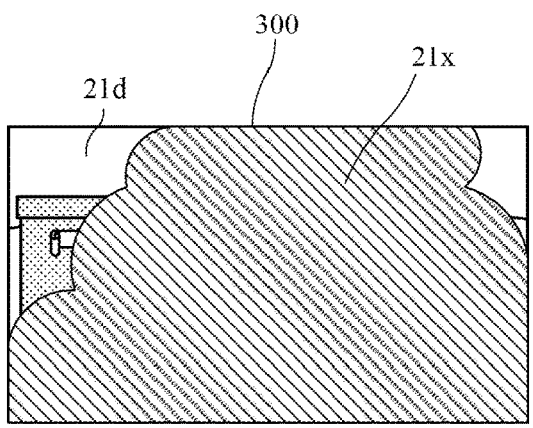
FIG. 1C is a diagram for conceptually describing the system 1 according to an embodiment of the present disclosure.

FIGS. 1B and 1C are diagrams for conceptually describing the system 1 according to an embodiment of the present disclosure. Specifically, FIG. 1B is an example of a screen of a case where the image (player object) of the player 11 is simply composited with the virtual space image on the display 300. In this case, a building object 21a exists in front of an arrangement position of the player object of the player 11. Therefore, the player object of the player 11 is hidden behind the building object 21a and cannot be visually recognized on the display 300. In the present embodiment, even in a positional relationship in which another virtual object is superimposed with the player object of the player 11, processing of temporarily non-displaying another virtual object is performed, and the player object of the player 11 is displayed on the display 300 in a visually recognizable state.

Further, FIG. 1C is another example of a screen of a case where the image (player object) of the player 11 is simply composited with the virtual space image on the display 300. In a case where a virtual object is arranged at a position extremely close to the position of the virtual camera 600 or in a case where the virtual camera 600 and the virtual object are arranged at approximately the same position and the virtual camera 600 is buried in the virtual object, a large part of an angle of view of the virtual camera 600 is covered by the virtual object and the visibility is impaired when the image captured by the virtual camera 600 is displayed on the display 300. Specifically, a tree object 21x in FIG. 1B is arranged at a position close to the virtual camera 600, and a large part of the obtained virtual space image is covered with the tree object 21x. Therefore, the existence of other virtual objects (for example, a part of the building object 21a, an enemy object 21b, etc.) existing behind the tree object 21x. Further, in a case where the tree object 21x is arranged at substantially the same position as the position of the virtual camera 600 and the virtual camera 600 is buries inside the tree object 21x, the entire angle of view of the virtual camera 600 is covered, and the visibility is significantly impaired. Therefore, in the present embodiment, processing of temporarily non-displaying the virtual object that can be arranged within a predetermined distance from the virtual camera 600 (for example, a position extremely close to the position of the virtual camera 600) is performed to improve the visibility of the image displayed on the display 300.

Note that, in the present embodiment, the "third person" is merely used distinctively from the player 11. That is, the third person himself/herself may be one of players who execute the game application or may merely view the state of playing by the player 11.

Further, in the present embodiment, the player object of the player 11 may be an extracted image of the player 11 imaged by the real space camera 200 or may be another one. For example, the player object may be a virtual character object stored in association with the player 11.

In the present embodiment, the case of execution of the game application will be described. However, the embodiment is not limited to the game application, and the system 1 according to the present embodiment is favorably applicable to any application as long as the application uses a virtual space. For example, by use of the system 1 in applications such as medical simulation, driving simulation of automobiles, trains, airplanes, etc., simulation of travel to tourist spots, virtual shopping in virtual shops and virtual real estate, entertainment such as movies and music lives, other players (third persons) can share the scene of operation with a user as a player.

Further, in the present embodiment, a real space image, a real space depth image, a real space color image, a virtual space image, a virtual space depth image, a virtual space color image, and the like are used. These images mean not only images immediately after captured by cameras but also images after various types of processing.

Further, in the present embodiment, the virtual space image is captured by the virtual camera 600 in synchronization with or at the same or substantially same timing with capture by the real space camera 200. As an example, the capture by the virtual camera 600 is performed by rendering the virtual space where the virtual objects are arranged from the position of the virtual camera 600 and projecting the virtual objects in the virtual space on a virtual screen to obtain an image.

Figure 2:
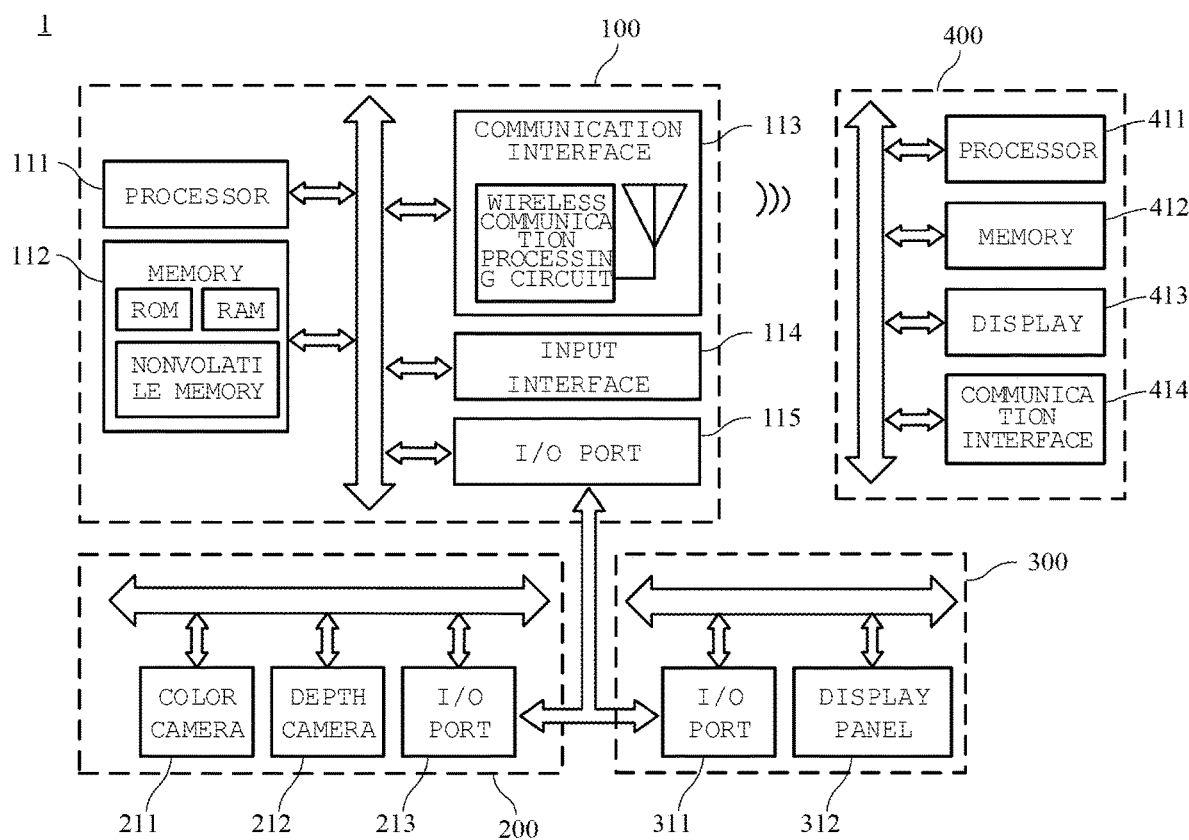
FIG. 2 is a block diagram illustrating a configuration of the system 1 according to an embodiment of the present disclosure.

2. Overall Configuration of System 1 According to First Embodiment of Present Disclosure FIG. 2 is a block diagram illustrating a configuration of the system 1 according to an embodiment of the present disclosure. Referring to FIG. 2, the system 1 includes a terminal device 100 that executes processing such as composite of images, the real space camera 200 that captures the real space image including the player 11 in the real space, who performs an instruction input to a virtual object arranged in the virtual space, and the display 300 for displaying an image in which at least a part of the virtual space image virtually imaged by the virtual camera arranged in the virtual space and a player image included in the real space image are composited, and the head mounted display 400 mounted by the player 11 and which displays the virtual space of the game application executed by the player 11. The terminal device 100, the real space camera 200, the display 300, and the head mounted display 400 are communicatively connected to one another by wired or wireless means.

Although not specifically illustrated, a detection device that detects movement in the virtual space or the instruction input by the player 11 for an operation of a virtual object may be included. Examples of the detection device include a device that is mounted on the player 11 and detects the motion of the player 11 by an acceleration sensor or a gyro sensor built in the device, and a device that is installed in a position separated from the player 11 and recognizes the motion of the player 11 as an image using an infrared sensor or a camera.

Further, the system 1 does not need to include all the configuration elements illustrated in FIG. 2, and can have a configuration in which a part of the configuration elements is omitted or a configuration to which another configuration element is added. Further, in the example of FIG. 2, the real space camera 200 and the display 300 are provided separately from the terminal device 100. However, the real space camera 200 and the display 300 can be provided as ones of the configuration elements of the terminal device 100.

3. Configuration of Terminal Device 100

The terminal device 100 includes a processor 111, a memory 112, a communication interface 113, an input interface 114, and an I/O port 115. Then, these configuration elements are electrically connected with one another through a control line and a data line.

The processor 111 is configured from a CPU (microcomputer), and functions as a control unit that controls connected other configuration elements on the basis of various programs stored in the memory 112. The processor 111 processes instruction commands stored in the memory 112, that is, a program for executing the application according to the present embodiment and a program for executing an OS. Specifically, the processor 111 executes various types of processing associated with execution of the game application that displays the virtual space, in cooperation with the head mounted display 400 and the detection device (not illustrated) that detects an instruction input of the player 11. Further, the processor 111 executes processing of controlling the real space camera 200 to generate the real space image. Further, the processor 111 executes processing of changing a display form of a predetermined virtual object (for example, a process of non-displaying the predetermined virtual object). Further, the processor 111 executes processing of compositing the real space image acquired by the real space camera 200 and the virtual space image virtually imaged by the virtual camera 600. Further, the processor 111 executes processing of outputting the composite image to the display 300.

Note that the processor 111 may be configured from a single CPU. However, the processor 111 may be configured from a plurality of CPUs. Further, the processor 111 may be configured from an appropriate combination of other types of processors such as a GPU dedicated to image processing. Further, the processor 111 processes the instruction commands stored in the memory 112. However, for example, the terminal device 100 may include a drive device capable of reading an optical disk or a cartridge in which the programs for executing the application according to the present embodiment is stored, and the processor 111 may execute the programs stored therein.

The memory 112 includes a RAM, a ROM, or a nonvolatile memory (in some cases, an HDD), and functions as a storage unit. The ROM stores the instruction commands for executing the application according to the present embodiment and the OS as programs. The RAM is a memory used to write and read data while the programs stored in the ROM are processed by the processor 111. The nonvolatile memory is a memory in which write and read of data are executed by execution of the programs, and the data written here is stored after the execution of the programs is terminated. In the memory 112, as an example, a virtual object information table (FIG. 3) for managing the virtual objects constituting the virtual space, player information of the player who executes the game application, game information such as scores as a result of execution of the game application, a program for executing the game application, a program for executing processing of compositing and outputting the real space image and the virtual space image, image data of the real space image captured by the real space camera 200 (data such as a color value and a depth value of each pixel), image data of the virtual space image virtually captured by the virtual camera 600, and the like are appropriately updated and stored. Although not specifically illustrated, an optical disk or a cartridge in which the various types of information described as examples are stored can be externally installed and used as a storage unit.

The communication interface 113 includes a wireless communication processing circuit and an antenna connected to the wireless communication processing circuit, and functions as a communication unit. The communication interface 113 transmits and receives the programs necessary for execution of the game application according to the present embodiment, user information, result information of execution of the game application, and the like to and from a server device (not illustrated) connected via a network. Further, the communication interface 113 transmits and receives game information, control information, drawing data, player information, and the like necessary for execution of the game application to and from the head mounted display 400. The wireless communication processing circuit performs processing such as modulation and demodulation of the information to be transmitted and received.

The communication interface 113 performs processing by a broadband wireless communication system represented by a wideband-code division multiple access (W-CDMA) system. However, the processing can be performed on the basis of a system related to a wireless LAN represented by IEEE802.11 or narrowband wireless communication such as Bluetooth (registered trademark). Further, the communication interface 113 can use wired communication in place of or in addition to the wireless communication. In this case, a communication processing circuit for wired communication may be provided in place of or in addition to the wireless communication processing circuit.

The input interface 114 includes a touch panel and/or a hard key, and receives various instruction inputs form the user. For example, the input interface 114 is used in performing various settings and the like necessary for compositing the virtual space image and the real space image.

The I/O port 115 is connected to each of I/O ports included in the real space camera 200 and the display 300, and serves as an information input/output unit for inputting/outputting information to/from the real space camera 200 and the display 300. Specifically, the I/O port 115 functions as an interface for receiving the real space image imaged by the real space camera 200 and outputting image data to be displayed on the display 300. Note that, as the I/O port 115, a known connection system such as a serial port, a parallel port, or a USB can be adopted at the request.

As an example of the terminal device 100, any terminal device is adoptable as long as the terminal device can communicate with the real space camera 200, the display 300, and the head mounted display 400 and can execute the game application according to the present embodiment, such as a stationary game machine, an arcade game machine, a desktop personal computer, a laptop personal computer, a portable game machine, and a smartphone.

Further, in the example of FIG. 2, only one terminal device 100 is described. However, it goes without saying that the configuration elements may be distributed in a plurality of terminal devices or processing may be executed in a distributed manner. Further, the terminal device 100 may be exclusively for executing the game application according to the present embodiment. However, the terminal device 100 may be able to execute other functions.

4. Configuration of Real Space Camera 200

The real space camera 200 includes a real space color camera 211 for capturing the real space color image, a real space depth camera 212 for capturing the real space depth image, and an I/O port 213. Then, these configuration elements are electrically connected with one another through a control line and a data line.

The real space color camera 211 includes a known image sensor such as a CCD image sensor or a CMOS image sensor. The real space color camera 211 receives light from a subject for each constituent pixel with a photodiode or the like, photoelectrically converts the light into the amount of electric charge, and sequentially reads and converts the charges into an image signal, thereby to generate the real space color image constituted by a plurality of pixels. The real space color image captured by the real space color camera 211 includes red, blue, and green subpixels for each pixel, as an example, and the brightness and shading of the color of each subpixel are generated as color values for each pixel and are stored in the memory 112.

The real space depth camera 212 includes a known depth sensor such as an infrared sensor. The real space depth camera 212 measures a value corresponding to a distance to an imaging target as the subject for each constituent pixel. The measured depth value is stored in the memory 112 for each pixel.

The I/O port 213 is connected to the I/O port 115 of the terminal device 100, and transmits image data of the real space image including the real space color image and the real space depth image captured by the real space camera 200 to the terminal device 100 and receives the control information of the real space camera 200 from the terminal device 100.

Note that the real space camera 200 does not need to include all the configuration elements illustrated in FIG. 2, and can have a configuration in which a part of the configuration elements is omitted or a configuration to which another configuration element is added. For example, although not specifically illustrated, the real space camera 200 appropriately includes a processor for controlling capture on the basis of the control information from the terminal device 100, a memory for storing captured image data, a communication interface for communicating with other devices including the terminal device 100.

Further, in the present embodiment, the case in which the real space camera 200 includes the real space color camera 211 and the real space depth camera 212 has been described. However, it is not necessary to have both of the cameras as long as the depth value of each pixel can be measured in addition to the real space color image. For example, the depth value may be measured by a known method using only the real space color camera 211, such as by measuring the depth value using a stereo color camera. A depth value may be measured using a monochrome stereo camera instead of the real space depth camera 212.

5. Configuration of Display 300

The display 300 includes an I/O port 311 and the display panel 312, and these configuration elements are electrically connected to each other via a control line and a data line. The I/O port 311 is connected to the I/O port 115 of the terminal device 100 and the I/O port 213 of the real space camera 200, and receives the image generated by the terminal device 100 and the image captured by the real space camera 200, and the like. Further, the display panel 312 functions as a display unit that displays the received image. As an example, the display panel 312 is configured from a liquid crystal display panel or an organic EL panel. Although not specifically illustrated, the display panel 312 includes a processor and a memory as appropriate.

6. Configuration of Head Mounted Display 400

The head mounted display 400 includes a processor 411, a memory 412, a display 413, and a communication interface 414, and these configuration elements are electrically connected to one another via a control line and a data line. The head mounted display 400 receives the image data for displaying the virtual space on the display 413 via the communication interface 414, stores the image data in the memory 412, processes the image data by the processor 411, and displays the image data on the display 413.

7. Virtual Object Information Table

Figures 3, 4:
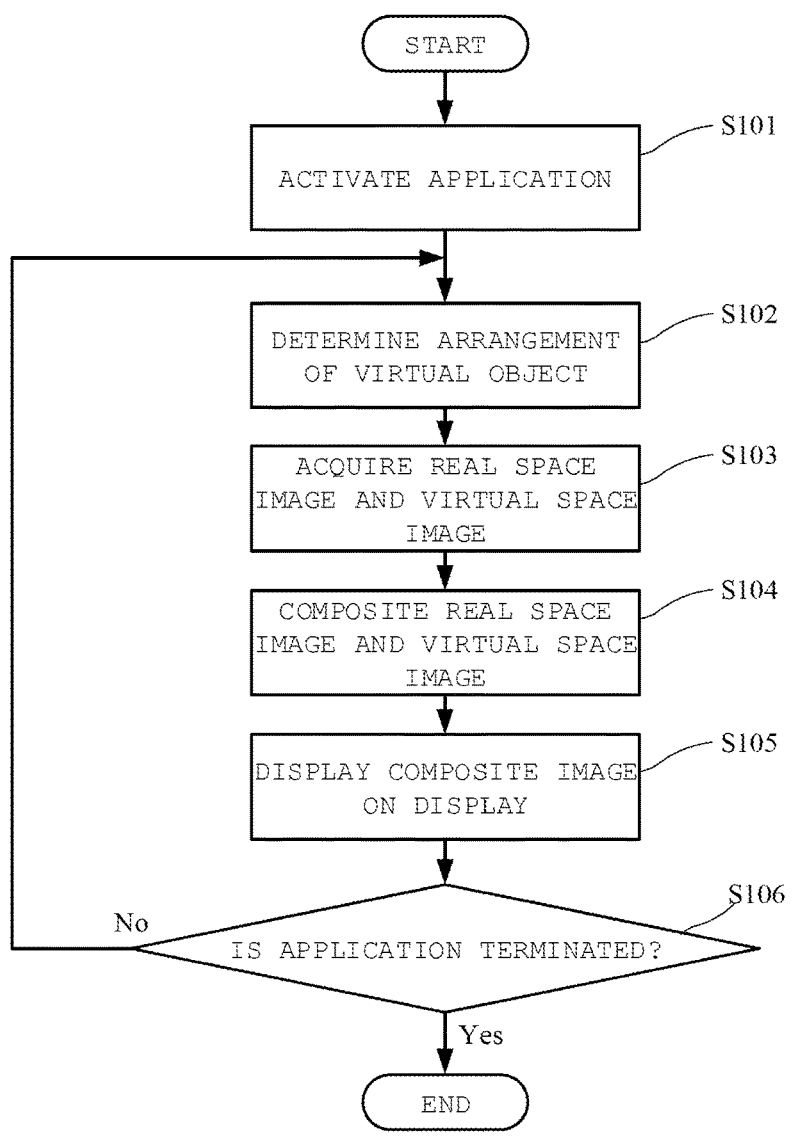
FIG. 3 is a diagram illustrating a virtual object information table stored in a memory 112 of a terminal device 100 according to an embodiment of the present disclosure.
FIG. 4 is a diagram illustrating a processing flow executed in the system 1 according to an embodiment of the present disclosure.

FIG. 3 is a diagram illustrating a virtual object information table stored in the memory 112 of the terminal device 100 according to an embodiment of the present disclosure. Specifically, FIG. 3 illustrates a table storing information specifying the arrangement position, shape, and the like of each virtual object such as the building object 21a arranged in the virtual space. Referring to FIG. 3, in the virtual object information table, attribute information such as arrangement coordinate information, type information, shape information, and display information are stored in association with an object ID for each individual virtual object.

The "arrangement coordinate information" is information indicating arrangement position coordinates in the virtual space, of the virtual object stored in association. The processor 111 refers to the arrangement coordinate information and specifies the positional relationship between the player object of the player 11 and the virtual object to be displayed. Further, the "type information" is information indicating the type of virtual object stored in association. The processor 111 refers to the type information and determines whether to change the display form of the virtual object, specifically, whether to non-display the virtual object, when it becomes the superimposition positional relationship with the player object of the player 11. The "shape information" is information for specifying the three-dimensional shape of the virtual object arranged in the virtual space. The processor 111 refers to the shape information and determines a ratio at which the player object of the player 11 is covered when it becomes the superimposition positional relationship with the player object of the player 11. The "display information" is, for example, information indicating whether to display the virtual object when it becomes the superimposition positional relationship with the player object of the player 11. The processor 111 refers to the display information and determines whether to arrange the virtual object in the virtual space. Note that the display information being "ON" means that the virtual object is displayed in the image when the virtual object is captured by the virtual camera 600, and "OFF" means that the virtual object is non-displayed. In the display information, "ON" information is stored in advance, and the "ON" information is updated with "OFF" and is stored only when non-display is determined by the processing of FIG. 5.

Note that the virtual object information table has been described as being stored in the memory 112 in the present embodiment. However, the virtual object information table may be stored in an external storage medium and referred to as appropriate. In addition, only the attribute information of the virtual object necessary for drawing may be downloaded from a server device (not illustrated) or the like as required and stored.

8. Processing Flow Executed in System 1

FIG. 4 is a diagram illustrating a processing flow executed in the system 1 according to an embodiment of the present disclosure. Specifically, the processing flow illustrated in FIG. 4 is a processing flow started when the game application according to the present embodiment is activated on the terminal device 100. The processing flow is performed by the processor 111 by reading and executing the instruction command (program) stored in the memory 112 in cooperation with the real space camera 200, the display 300, and the head mounted display 400

According to FIG. 4, the processing flow is started when an instruction input of activation of the game application by the player 11 is detected in the input interface 114 or the detection device (not illustrated) (S101). Thereafter, the processing of drawing the virtual space to be displayed on the head mounted display 400 and the display 300 is executed with the start of the game application. Specifically, first, the processor 111 determines whether to arrange each virtual object in a predetermined virtual space (S102). Then, after arranging the virtual object in the virtual space according to the determination result, the processor 111 controls the real space camera 200 to acquire the real space image including the player 11 captured by the real space camera 200 and store the real space image in the memory 112 (S103). In synchronization with the processing, the processor 111 virtually captures the virtual space displayed on the head mounted display 400 by the virtual camera 600 and acquires the virtual space image (S103). Next, the processor 111 extracts the player image of the player 11 from the real space image stored in the memory 112, and composites the virtual space image with the extracted player image as the player object (S104). Note that the extraction of the player image of the player 11 is performed on the basis of the depth value measured for each pixel constituting the real space depth image and the color value of the real space color image. Then, the processor 111 outputs the composite image to the display 300, and controls the display 300 to display the image on the display 300 (S105). Next, the processor 111 determines whether an instruction input for termination of the game application by the player 11 has been detected, and when the instruction input has not been detected, the processor 111 repeats the processing of S102 to S105 at predetermined intervals (for example, every 30 milliseconds) after resets the display information in FIG. 3 to "ON" (S106). On the other hand, when the instruction input for termination of the game application has been detected, the processor 111 terminates the execution of the application. Note that S102 to S105 will be described in more detail in FIGS. 5 and 6, and the like.

9. Processing Flow Executed in Terminal Device 100

Figure 5:
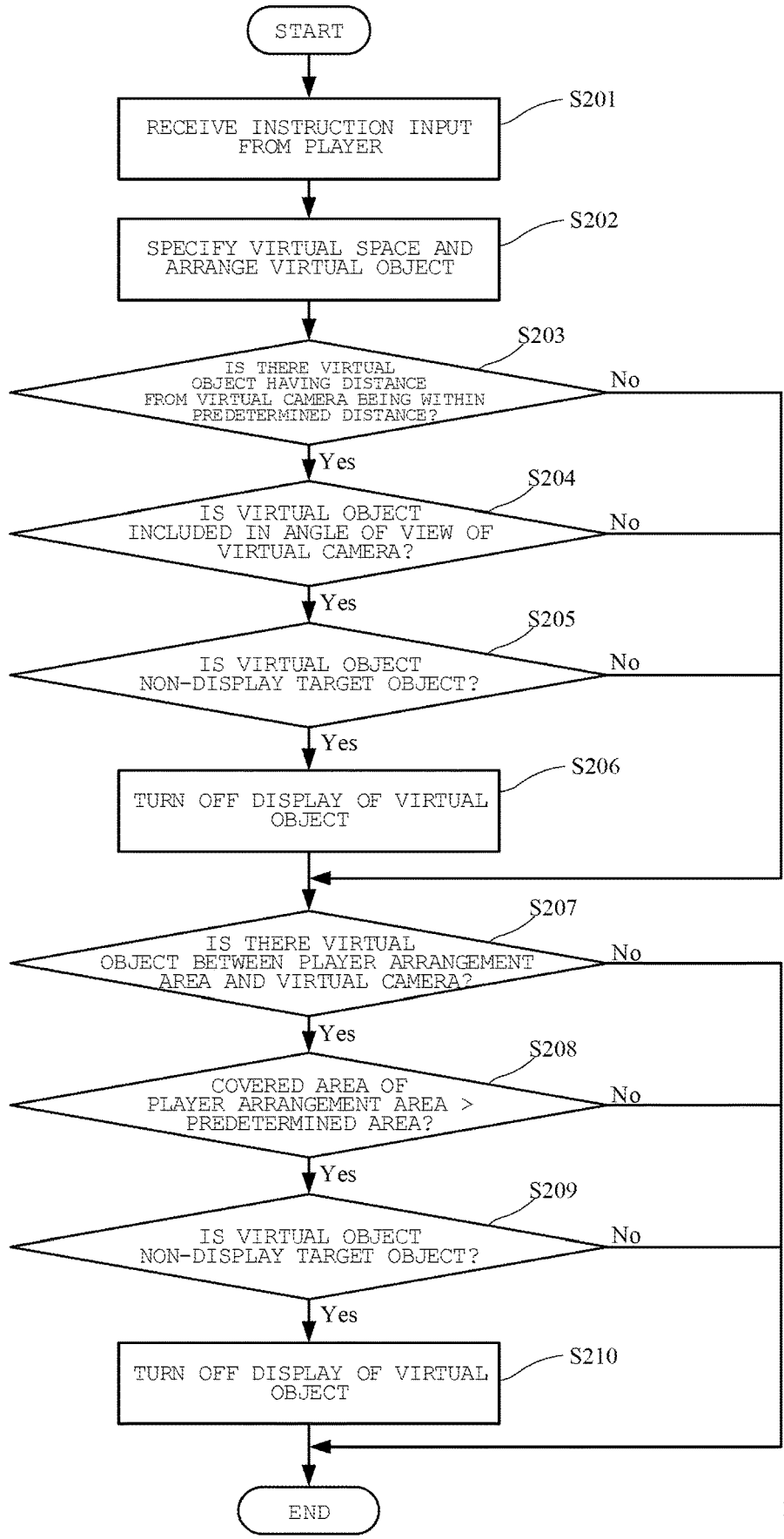
FIG. 5 is a diagram illustrating a processing flow executed in the terminal device 100 according to an embodiment of the present disclosure.

FIG. 5 is a diagram illustrating a processing flow executed in the terminal device 100 according to an embodiment of the present disclosure. Specifically, FIG. 5 illustrates a flow of determination processing as to whether to arrange the virtual object in the virtual space in S102 of FIG. 4, that is, whether to display the virtual object when captured by the virtual camera 600. The processing flow is performed by the processor 111 by reading and executing the instruction command (program) stored in the memory 112 in cooperation with the real space camera 200, the display 300, and the head mounted display 400.

According to FIG. 5, first, the processor 111 performs control to receive an instruction input from the player via the input interface 114 or the detection device (S201). Next, the processor 111 specifies a virtual space that is a virtual space to be displayed on the display 300 and is constituted by a virtual space with the position of the virtual camera 600 as the origin, on the basis of the instruction input, and arranges the virtual object in the virtual space by reference to the arrangement coordinate information in the virtual object information table (FIG. 3) (S202). Next, the processor 111 determines whether there is a virtual object arranged at a predetermined position from the virtual camera 600, that is, at a predetermined distance from the virtual camera 600, which is closer than a predetermined distance (S203).

Figure 7A:
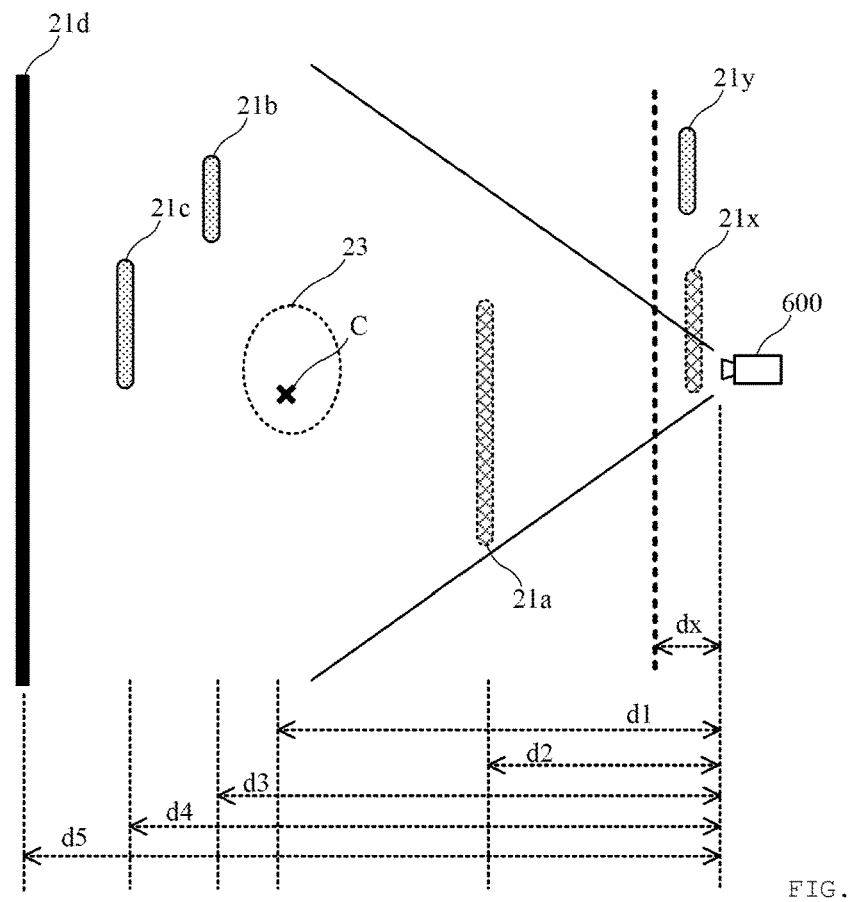
FIG. 7A is a diagram conceptually describing a virtual space captured by a virtual camera 600 according to an embodiment of the present disclosure. Further.

Here, FIG. 7A is a diagram conceptually describing the virtual space captured by the virtual camera 600 according to an embodiment of the present disclosure. Specifically, FIG. 7A illustrates a positional relationship between a player arrangement area 23 and each virtual object in the virtual space with the position of the virtual camera 600 as the origin. Referring to FIG. 7A, the tree object 21x and a tree object 21y separately exist at positions within a predetermined distance dx from the virtual camera 600. Note that, as an example, the distance may be calculated as a distance from the virtual camera 600 to a plane formed by the tree object 21x or may be calculated as a distance of a line segment connecting the virtual camera 600 and an arbitrary point of the tree object 21x. Further, the predetermined distance is set to the distance dx in the present embodiment. However, the predetermined distance can be appropriately adjusted. Further, the distance can be made variable for each processing.

Next, in S203, the processor 111 determines whether the virtual objects (the tree objects 21x and 21y) specified to exist within the predetermined distance dx from the virtual camera 600 are included in the angle of view of the virtual camera 600 (S204). Referring to FIG. 7A, the tree object 21x exists at the position included in the angle of view of the virtual camera 600, but the tree object 21y does not exist at the position included in the angle of view. Then, in S204, when there is a virtual object included within the angle of view of the virtual camera 600, the processor 111 determines whether the virtual object is a non-display target object (S205). Specifically, the processor 111 refers to the type information in the virtual object information table in FIG. 3. In the case where, as the type information, type information that is a target displayed on a constant basis is stored, such as a character like "enemy" or "buddy" or a basic structure like "water", "ground", or "door", the virtual object does not need to be non-displayed. Meanwhile, the virtual objects that hinder the visibility when superimposed with the player object, like structures such as "building", "wall", and "box" and the type information indicating the background such as "grass", "tree", and "forest", the virtual objects are non-displayed. Therefore, the processor 111 refers to the type information and determines whether the virtual object has been determined to be non-displayed in advance when superimposed with the player object. Next, when the virtual object is determined to be the virtual object to be non-displayed, the processor 111 updates the display information in the virtual object information table in FIG. 3 with "OFF" and stores the display information to non-display the virtual object (S206).

Next, the processor 111 determines whether a virtual object is arranged between the player arrangement area 23 set at a predetermined position from the virtual camera 600, that is, at a predetermined coordinate position, and the virtual camera 600 (S207). Note that the player arrangement area 23 indicates an area where the player object is arranged, the player object being operated by the instruction input of the player 11 who wears the head mounted display 400 in real space. The player arrangement area 23 can be newly set for processing according to the present embodiment, or a collision determination area used for determining a collision between the player object and a virtual object may be used as the player arrangement area 23.

Referring to FIG. 7A, an enemy object 21b, a cloud object 21c, and a background object 21d exist behind the player arrangement area 23, as viewed from the virtual camera 600. Meanwhile, a building object 21a exists in front of the player arrangement area 23. Here, the building object 21a is located in front of the player object when the player object of the player 11 is arranged in the virtual space. That is, when captured from the virtual camera 600, the player object is covered with the building object 21a. To prevent hindrance of the visibility of the player object in this manner, whether the virtual object is arranged between the player arrangement area 23 and the virtual camera 600 is determined in S207 in FIG. 5.

Referring back to FIG. 5, when a virtual object is determined to be arranged between the player arrangement area 23 and the virtual camera 600, the processor 111 refers to the shape information (FIG. 3) of the virtual object and calculates the ratio and the area by which the player arrangement area 23 is covered (S208). When the calculated ratio and the area are equal to or larger than a predetermined ratio and area, the processor 111 determines whether the virtual object (tree object 21x) is the non-display target object similarly to S205 (S209). At this time, determination as to whether the object is the non-display target object may be determined on the basis of the same criteria as in S205 or may be changed. For example, in S205, the characters such as "enemy" and "buddy" and the basic structures such as "water", "ground", and "door" are set to display target objects, and others are set to the non-display target objects. However, in S209, in addition to the above objects, weapon objects such as "sword", "shield", and "armor" may also be set to the display target objects, and others may be set to the non-display target objects.

Next, when the virtual object is determined to be the virtual object to be non-displayed, the processor 111 updates the display information in the virtual object information table in FIG. 3 with "OFF" and stores the display information to non-display the virtual object (S210). The determination processing as to whether to arrange the virtual object in the virtual space, that is, whether to display the virtual object when captured by the virtual camera 600 is terminated.

When "No" in any of S203 to S205 and "No" in any of S207 to S209, the virtual object is to be displayed, the display information is not updated.

Taking the virtual space in FIG. 7A as an example, the tree object 21x is located within a predetermined distance dx from the virtual camera 600 (S203) and is included within the angle of view of the virtual camera (S204), and its type information is "tree" that is to be non-displayed (S205).

Therefore, the display information of the tree object 21x is updated to OFF, and the tree object 21x is not arranged when the processor 111 arranges a virtual object in the virtual space and is also not displayed when the virtual camera 600 virtually captures a virtual object.

In addition, the building object 21a is located between the player arrangement area 23 and the virtual camera 600 (S207), the entire area of the player arrangement area 23 is covered (S208), and the type information of the building object 21a is "building" that is to be non-displayed (S209). Therefore, the display information of the building object 21a is updated to OFF, the building object 21a is not arranged when the processor 111 arranges a virtual object in the virtual space and is also not displayed when the virtual camera 600 virtually captures a virtual object.

Figure 6:
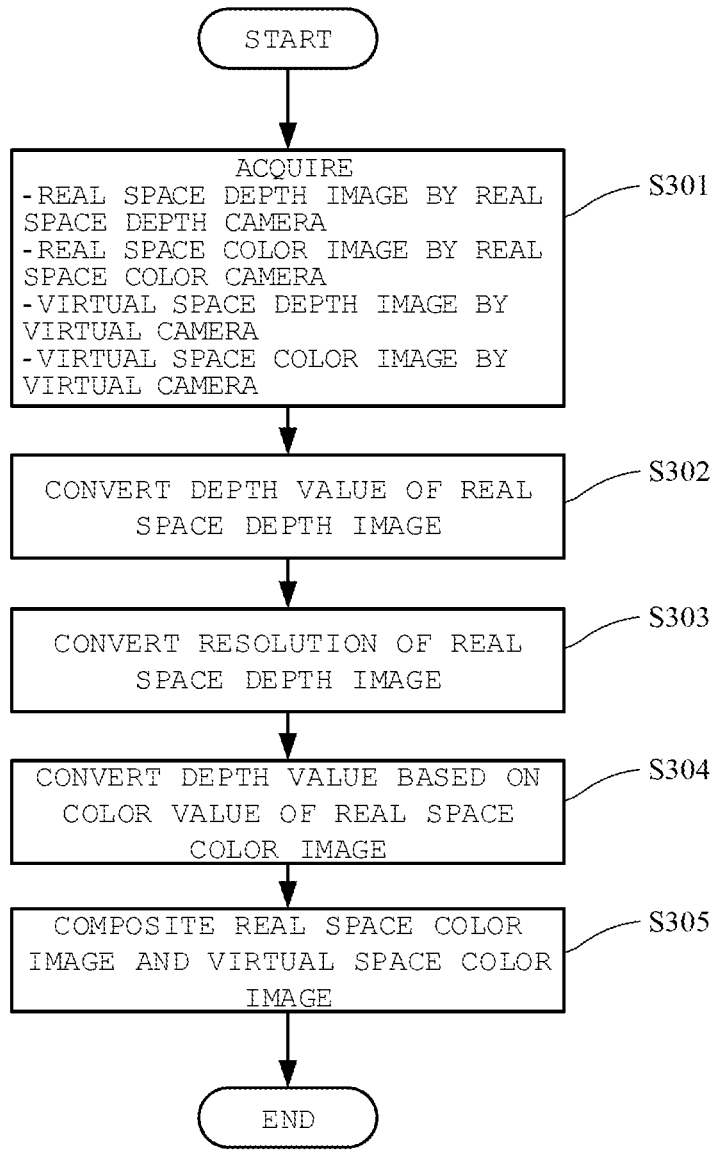
FIG. 6 is a diagram illustrating a processing flow executed in the terminal device 100 according to an embodiment of the present disclosure.

FIG. 6 is a diagram illustrating a processing flow executed in the terminal device 100 according to an embodiment of the present disclosure. Specifically, the processing flow illustrated in FIG. 6 is a processing flow regarding composite of the real space image and the virtual space image. The processing flow is performed by the processor 111 by reading and executing the instruction command (program) stored in the memory 112 in cooperation with the real space camera 200, the display 300, and the head mounted display 400

According to FIG. 6, first, the processor 111 acquires the real space depth image captured by the real space depth camera 212 and the real space color image captured by the real space color camera 211 and stores the images in the memory 112, and generates and stores the virtual space depth image and the virtual space color image virtually captured by the virtual camera 600 in the memory 112 (S301). In the present embodiment, the real space depth image, the real space color image, the virtual space depth image, and the virtual space color image are captured by the real space camera 200 or the virtual camera 600 in synchronization with one another, that is, at the same or substantially the same timing.

Figure 7B:
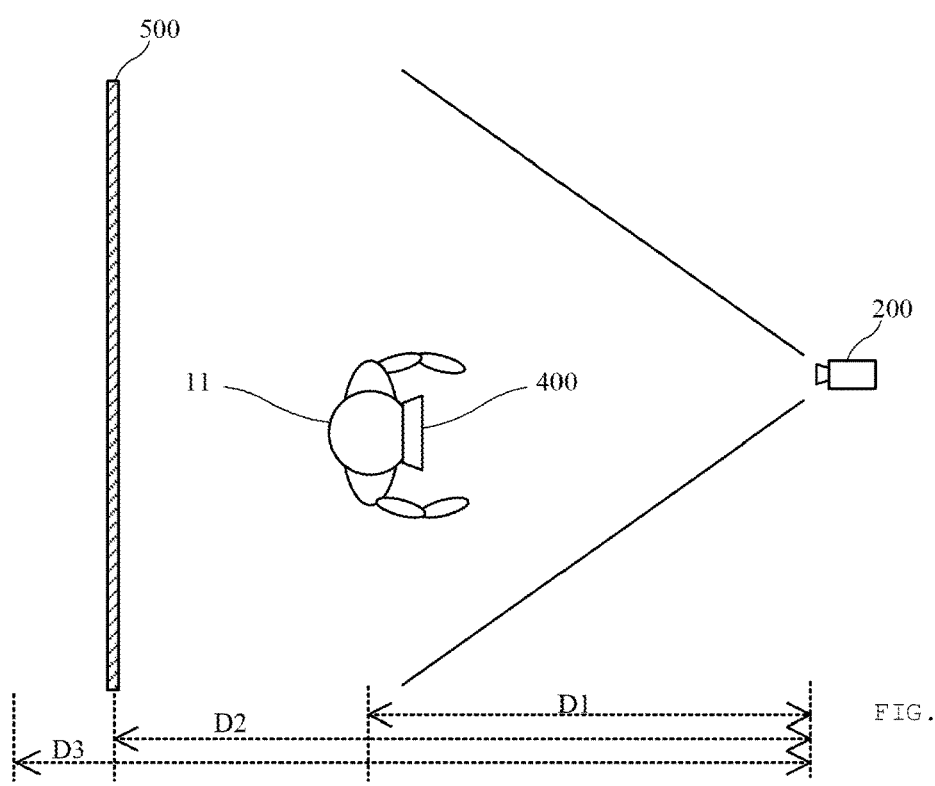
FIG. 7B is a diagram conceptually describing a real space captured by a real space camera 200 according to an embodiment of the present disclosure.

FIG. 7B is a diagram conceptually describing the real space captured by the real space camera 200 according to an embodiment of the present disclosure. Specifically, FIG. 7B is a diagram for describing a state in which the player 11 and a background cloth 500 to be used for chroma key compositing are captured by the real space color camera 211 and the real space depth camera 212. According to FIG. 7B, the player 11 mounting the head mounted display 400 performs a movement in the virtual space displayed on the head mounted display 400 and an instruction input to the virtual object arranged in the virtual space. Behind the player 11, the background cloth 500 as a part of the background when the image imaged by the real space color camera 211 is arranged. That is, the player 11 exists at a distance D1 (for example, 2 m) from the real space camera 200, and the background cloth 500 is arranged at a distance D2 (for example, 4 m) that is equal to or more than the distance D1 from the real space camera 200 with respect to the real space camera 200. The real space camera 200 captures such a real space at appropriate timing (for example, every 30 milliseconds).

Note that, as the background cloth 500, background cloth used for chroma key compositing is favorably used. As an example, what is referred to as so-called greenback or blueback, which is green or blue over the entire surface, is used. Further, the material is not particularly limited to cloth, and for example, a plate-like wall material or the like can also be used. Further, in this embodiment, as will be described in detail below, the depth value is used in combination for the extraction of the player 11 from the captured real space image, and thus only an area around the player 11 needs green or blue background. Therefore, a wide range such as used in conventional chroma key compositing does not need to be covered with green or blue, and it is sufficient that a narrow range only around the player 11 is the green or blue background.

Further, as described above, FIG. 7A illustrates a diagram for conceptually describing the virtual space captured by the virtual camera 600 according to an embodiment of the present disclosure. According to FIG. 7A, the virtual camera 600 is arranged in the virtual space in association with the position where the real space camera 200 is arranged in the real space. That is, in the real space, the player 11 exists at the position of a coordinate C, and the virtual camera 600 is arranged at a position separated by a distance dl corresponding to the distance D1 in the real space. Then, the enemy object 21b is virtually arranged at a coordinate position separated by a distance d3 larger than the distance d1, the cloud object 21c is virtually arranged at a coordinate position separated by a distance d4, and the background object 21d at a coordinate position separated by a distance d5, on the basis of the arrangement coordinate information stored in the virtual object information table in FIG. 3, on a coordinate space with the position of the virtual camera 600 as the origin. Note that the building object 21a and the tree object 21x are non-displayed by the processing in FIG. 5, and thus are not arranged in the virtual space. The virtual camera 600 virtually captures such a virtual space in synchronization with, that is, at the same or substantially same timing with the capture of the real space camera.

Figure 8A:
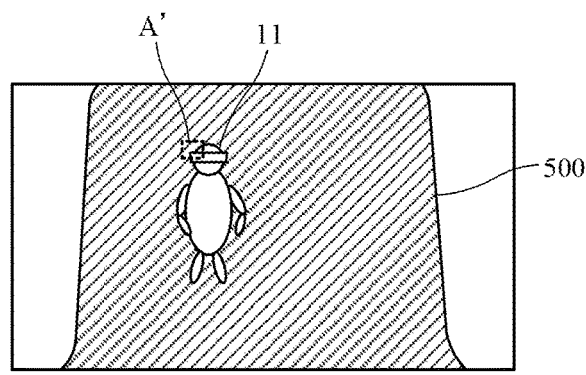
FIG. 8A is a diagram illustrating an example of a real space image captured by the real space camera 200 according to an embodiment of the present disclosure.

FIG. 8A is a diagram illustrating an example of the real space image captured by the real space camera 200 according to an embodiment of the present disclosure. Specifically, FIG. 8A illustrates the real space color image captured by the real space color camera 211 of the real space camera 200. In the real space color image, color values corresponding to wavelengths of light reflected from objects to be captured including the player 11 and the background cloth 500 in the real space are stored on a pixel to pixel basis. Therefore, respective colors of the player 11 and the background cloth 500 (the greenback in the present embodiment) are reproduced on a pixel to pixel basis.

Figure 8B:
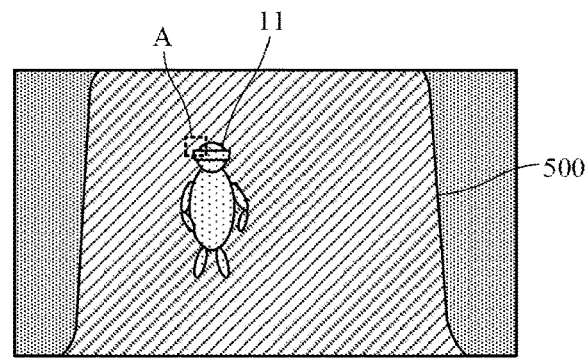
FIG. 8B is a diagram illustrating an example of the real space image captured by the real space camera 200 according to an embodiment of the present disclosure.

FIG. 8B is a diagram illustrating an example of the real space image captured by the real space camera 200 according to an embodiment of the present disclosure. More specifically, FIG. 8B illustrates the real space depth image captured by the real space depth camera 212 of the real space camera 200. The real space depth camera 212 is arranged at substantially the same position as the real space color camera 211 and captures the image in synchronization with the capture of the real space color camera 211. Therefore, the same scene is captured at substantially the same angle of view as the real space color camera 211. Therefore, the real space depth image includes the player 11 and the background cloth 500.

Meanwhile, in the real space depth image, the depth value measured by the real space depth camera 212 is stored for each pixel constituting the real space depth image. Note that the real space depth image in FIG. 8B and the like and the virtual space depth image in FIG. 8D and the like are drawn in gradations corresponding to the depth values (for example, in two gradations where the depth value zero is in white and the depth value in maximum is in black) for convenience of description. That is, the depth value corresponding to the distance D1 is stored in each pixel existing at the coordinates of the player 11 existing at the distance D1 from the real space depth camera 212, and the player 11 is drawn in the gradation corresponding to the depth value. Further, the depth value corresponding to the distance D2 is stored in each pixel existing at the coordinates of the background cloth 500 arranged at the distance D2 from the real space depth camera 212, and the background cloth 500 is drawn in the gradation corresponding to the depth value. For convenience of explanation, the depth values of the pixels constituting the player 11 are uniformly the distance D1. However, since the player 11 is actually a three-dimensional object having a depth, each pixel constituting the player 11 has a different depth value.

Figure 8C:
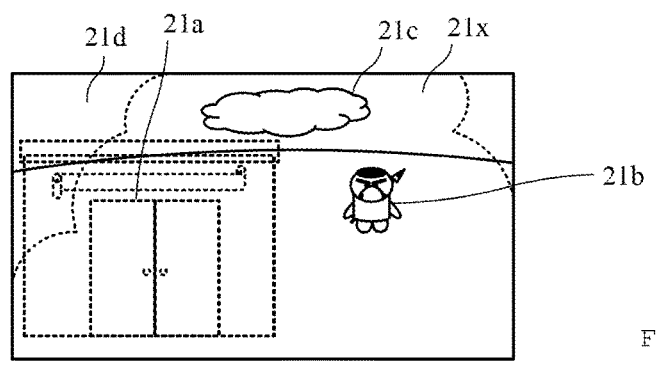
FIG. 8C is a diagram illustrating an example of a virtual space image captured by the virtual camera 600 according to an embodiment of the present disclosure. Further.

FIG. 8C is a diagram illustrating an example of the virtual space image captured by the virtual camera 600 according to an embodiment of the present disclosure. More specifically, FIG. 8C illustrates the virtual space color image virtually captured by the virtual camera 600. The virtual camera 600 is arranged at a position corresponding to the real space camera 200 and captures the image in synchronization with the capture of the real space camera 200. Therefore, the virtual space is captured at substantially the same angle of view as the real space color camera 211. Therefore, the virtual space color image includes the virtual space, and the background object 21d, the cloud object 21c, and the enemy object 21b arranged at the predetermined coordinate positions in the virtual space. Further, for all the virtual objects constituting the virtual space, including the virtual objects 21b to 21d, information such as a color (a color value of each pixel constituting the virtual object) and the like are stored in the virtual object information table illustrated in FIG. 3, in addition to the attribute information illustrated in FIG. 3. Therefore, the virtual space color image is reproduction of the scene captured by the virtual camera 600 on a pixel to pixel basis on the basis of the color values held by the virtual objects. Note that the building object 21a and the tree object 21x are non-displayed by the processing in FIG. 5, and thus are not displayed.

Figure 8D:
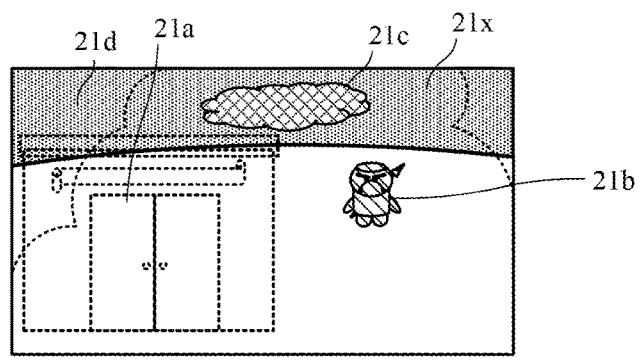
FIG. 8D is a diagram illustrating an example of the virtual space image captured by the virtual camera 600 according to an embodiment of the present disclosure.

FIG. 8D is a diagram illustrating an example of the virtual space image captured by the virtual camera 600 according to an embodiment of the present disclosure. More specifically, FIG. 8D illustrates the virtual space depth image virtually captured by the virtual camera 600. For all the virtual objects constituting the virtual space, including the virtual objects 21b to 21d, the depth value of each pixel constituting the virtual object is calculated on the basis of the arrangement coordinate information and the shape information, in addition to the storage of the attribute information illustrated in FIG. 3. Specifically, by converting each virtual object in the virtual space into a camera coordinate system with the virtual camera 600 as the origin on the basis of the attribute information, the distance from the position of the virtual camera 600 is calculated. Then, by projection-converting each virtual object from the position of the virtual camera 600 onto the virtual screen, the distance from the virtual camera 600 is calculated for each pixel constituting the virtual space depth image. FIG. 8D is reproduction based on the depth value corresponding to the distance from the virtual camera 600 calculated for each pixel. Note that the building object 21a and the tree object 21x are non-displayed by the processing in FIG. 5, and thus are not reproduced.

Returning back to FIG. 6, when the real space images and the virtual space images illustrated in FIGS. 8A to 8D as examples are each obtained or generated, and stored in the memory 112, the processor 111 then performs processing of converting the depth values included in the real space depth image (S302).

Specifically, the depth value corresponding to the distance from the real space depth camera 212 is stored for each pixel constituting the real space depth image. In the processing, in a case the depth value is larger than a threshold, processing of converting the depth value into a depth value indicating infinity (that is, a theoretical maximum depth value (for example, in a case where a range of 0 to 10 m is expressed by 16-bit depth values of 0 to 65535, the depth value of "65535" is set for all behind 10 m)) and storing the depth value is performed. In the present embodiment, as the predetermined value, a value corresponding to a distance D3 that is farther than the player 11 and the background cloth 500 is set. Therefore, the depth values of all the pixels for which depth values equal to or larger than the predetermined value corresponding to the distance D3 are converted into the depth value indicating infinity and stored. Meanwhile, since the depth values less than the depth value corresponding to the distance D3 are stored for the pixels constituting the player 11 and the background cloth 500, the depth values are not converted.

Figure 9:
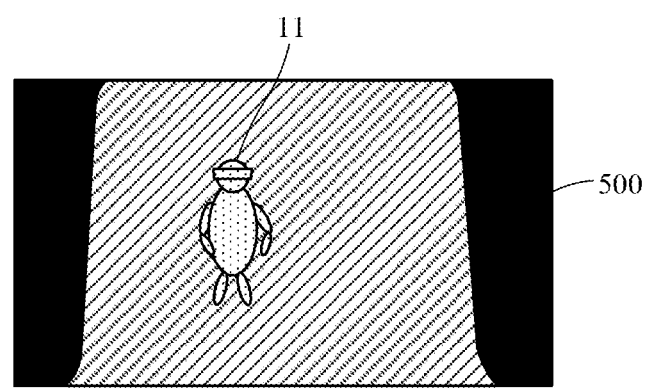
FIG. 9 is a diagram illustrating an example of a real space depth image according to an embodiment of the present disclosure.

FIG. 9 is a diagram illustrating an example of the real space depth image according to an embodiment of the present disclosure. Specifically, FIG. 9 is a diagram after the depth value conversion processing of S302 is performed for the real space depth image illustrated in FIG. 8B. As described above, in an area 22 farther than the distance D3, the depth values have been converted into the depth value indicating infinity, and thus the area is drawn in black indicating infinity. Meanwhile, in an area (the player 11 and the background cloth 500)) closer than the distance D3, the depth values are not converted from the measured depth values, and the area is drawn in the gradations corresponding to the original depth values.

Referring back to FIG. 6, after the depth value conversion processing of the real space depth image is performed, the processor 111 performs processing of converting the resolution of the real space depth image (S303). Typically, the resolution of the real space depth camera 212 is lower than the resolution of the real space color camera 211. That is, the real space depth image illustrated in FIG. 8B is captured at a relatively low resolution (first resolution) by the real space depth camera 212, and the real space color image illustrated in FIG. 8A is captured at a second resolution higher than the first resolution by the real space color camera 211. Therefore, when the image of the player 11 is extracted on the basis of the real space depth image that is unchanged from what has been captured, an unnecessary area such as the area where the background cloth 500 is displayed is extracted as the image of the player 11 in the real space color image. Therefore, to minimize clipping of such an unnecessary area and to more vividly extract the image of the player 11, processing of converting the resolution of the real space depth image in S303 of the present embodiment is necessary. In the present embodiment, for example, the real space color camera 211 has a resolution four times as large as the resolution of the real space depth camera 212. Therefore, in this conversion processing, the resolution of the real space depth image is converted into a quadruple resolution corresponding to the resolution of the real space color camera 211. In the present embodiment, the resolution is set to the quadruple resolution for convenience of description. However, the resolution can appropriately set according to the resolutions of the real space color camera 211 and the real space depth camera 212 to be used.

Figure 10A:
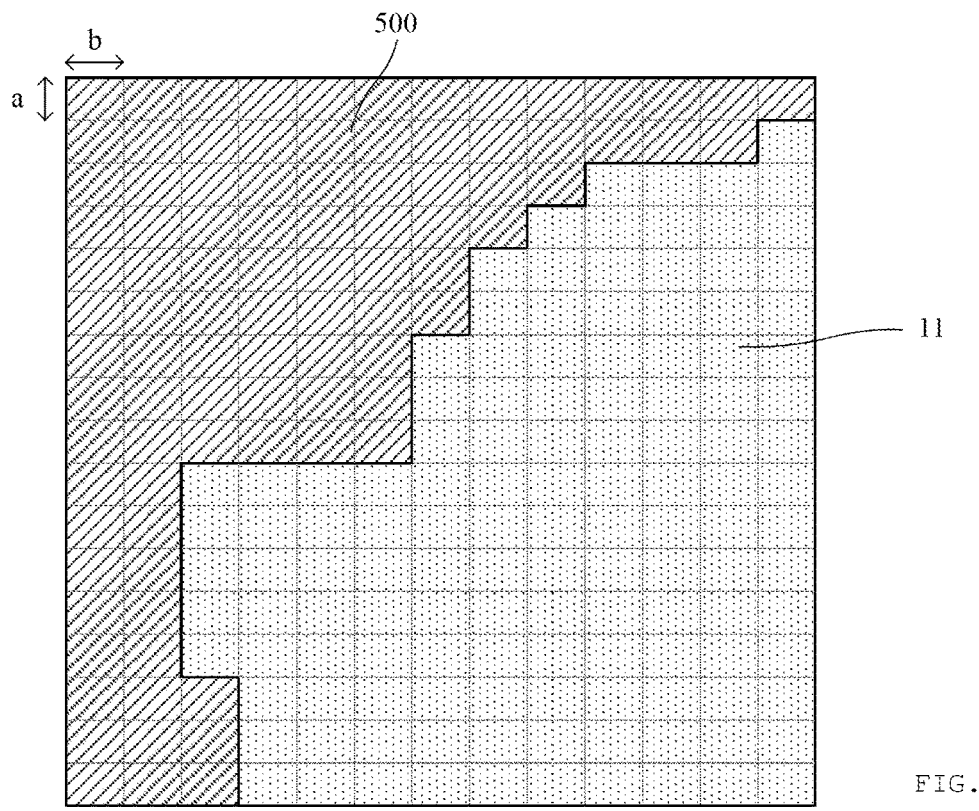
FIG. 10A is a diagram illustrating an example of the real space depth image according to an embodiment of the present disclosure. Further.

FIG. 10A is a diagram illustrating an example of the real space depth image according to an embodiment of the present disclosure. Specifically, FIG. 10A is an enlarged diagram of an area A of the real space depth image in FIG. 8B, illustrating an image before the resolution conversion processing in S303 is executed. According to FIG. 10A, the real space depth image is constituted by pixels each having the size of a×b.

Figure 10B:
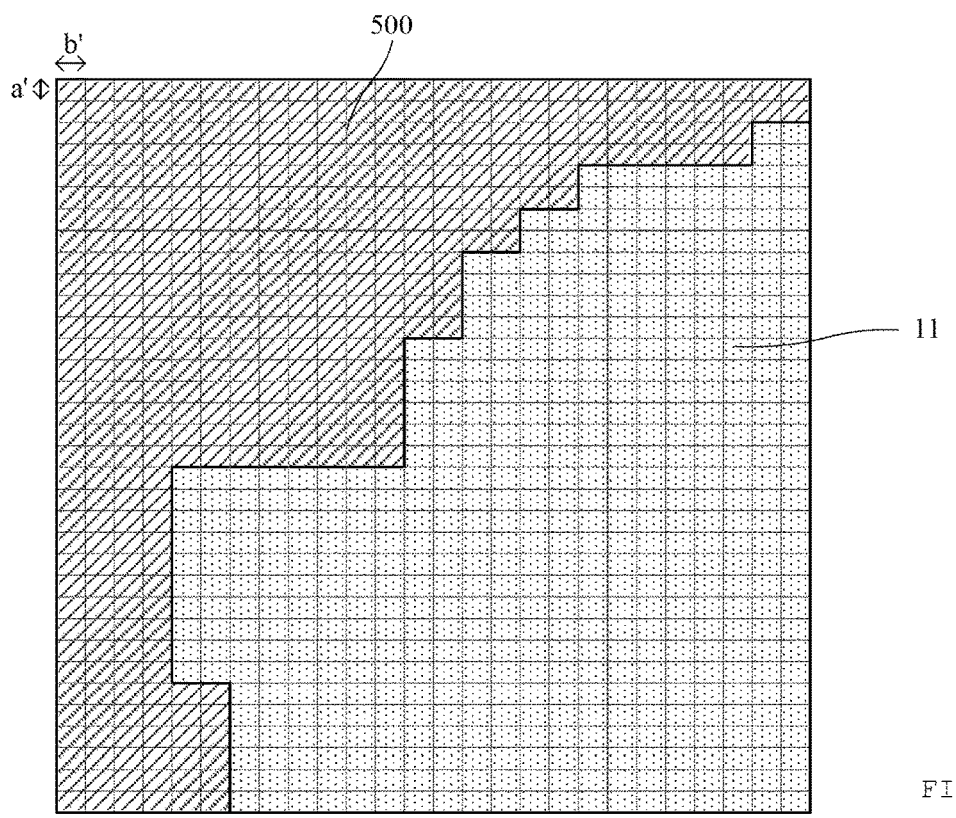
FIG. 10B is a diagram illustrating an example of the real space depth image according to an embodiment of the present disclosure.

FIG. 10B is a diagram illustrating an example of the real space depth image according to an embodiment of the present disclosure. Specifically, FIG. 10B illustrates an image after the resolution conversion processing in S303 is executed. In the present embodiment, as described above, the processing of converting the resolution into the quadruple resolution corresponding to the resolution of the real space color camera 211 is executed. Therefore, according to FIG. 10B, each pixel is refined to have half the length (a'×b') in both the length and width. In each pixel after the resolution conversion processing, the depth value that was held by each pixel before the processing is stored as it is.

Referring back to FIG. 6, after the processing of converting the resolution of the real space depth image is performed, the processor 111 performs processing of converting the depth value on the basis of the color value of the real space color image (S304). Specifically, processing of converting the depth value of the pixel of the real space depth image located at the same coordinate position as the pixel having the color value of the color (in this embodiment, green) of the background cloth 500 in the real space color image into the depth value indicating infinity.

Figure 11A:
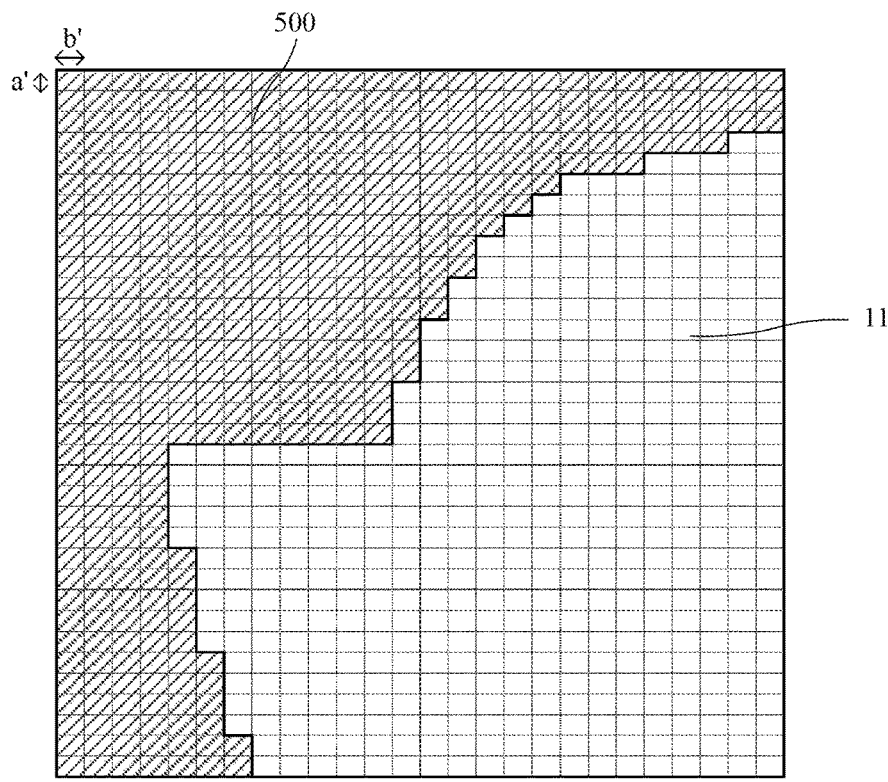
FIG. 11A is a diagram illustrating an example of a real space color image according to an embodiment of the present disclosure.

FIG. 11A is a diagram illustrating an example of the real space color image according to an embodiment of the present disclosure. Specifically, FIG. 11A is an enlarged diagram of an area A' of the real space color image of FIG. 8A. According to FIG. 11A, the real space color image including the image of the player 11 and the image of the background cloth 500 is drawn at the same resolution (one pixel is constituted in a'×b') as the real space depth image after the resolution conversion processing illustrated in FIG. 10B. Therefore, the boundary between the player 11 and the background cloth 500 is more finely drawn than the real space depth image illustrated in FIG. 10A.

Figure 11B:
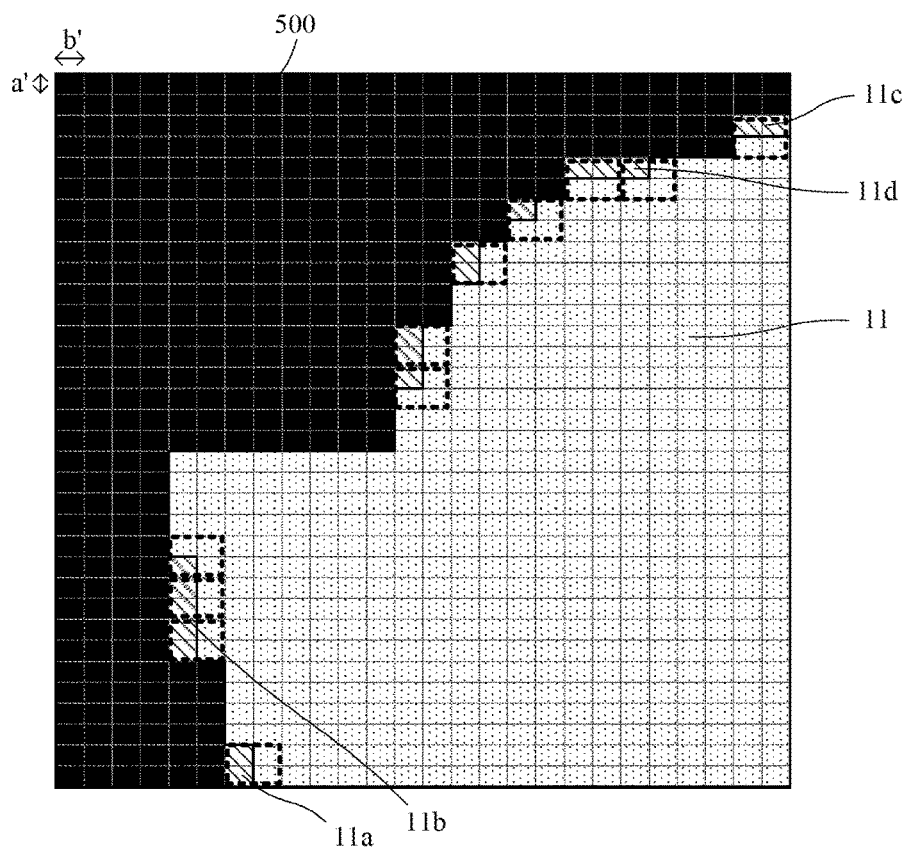
FIG. 11B is a diagram illustrating an example of the real space depth image according to an embodiment of the present disclosure. Further.

FIG. 11B is a diagram illustrating an example of the real space depth image according to an embodiment of the present disclosure. Specifically, FIG. 11B is a diagram illustrating a difference in a boundary between the player 11 and the background cloth 500 in the real space depth image after the resolution conversion processing illustrated in FIG. 10B and the real space color image in FIG. 11A. According to FIG. 11B, in the original real space depth image having a low resolution, the pixels of areas 11a to 11d and the like illustrated by the diagonally right lines have the same depth value as the other pixels of the player 11, are extracted as the player 11. However, in the real space color image (FIG. 11A) having a higher resolution, the pixels of areas 11a to 11d and the like illustrated by the diagonally right lines are not pixels extracted as the player 11 but pixels to be cut out as the background cloth 500. Therefore, if the image of the player 11 is extracted on the basis only on the original real space depth image having a low resolution, the background cloth 500 coexists in a part of a contour, resulting in an inferior appearance image. Therefore, in the present embodiment, the processing of converting all the depth values of the pixels of the real space depth image located at the same coordinate positions as the pixels having the color value of the color (in this embodiment, green) of the background cloth 500 in the real space color image into the depth value indicating infinity so as not to extract the area of the background cloth 500.

Figure 11C:
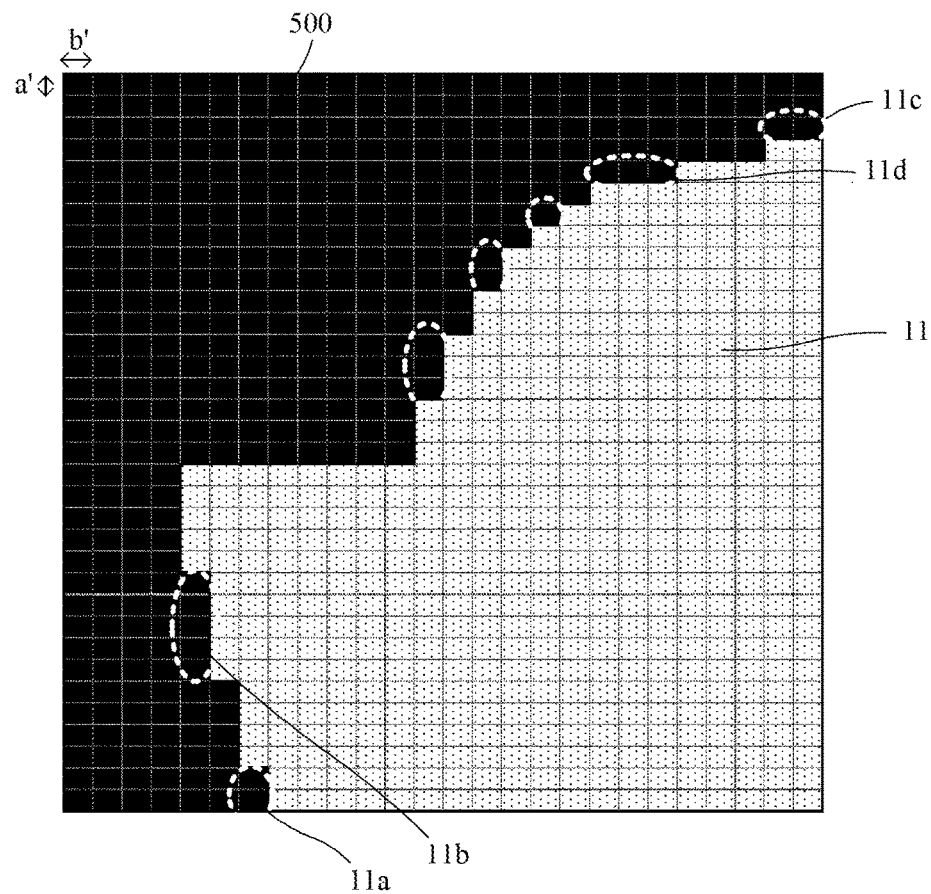
FIG. 11C is a diagram illustrating an example of the real space depth image according to an embodiment of the present disclosure.

FIG. 11C is a diagram illustrating an example of the real space depth image according to an embodiment of the present disclosure. Specifically, FIG. 11C is a diagram illustrating the real space depth image after the depth value conversion processing in S304. According to FIG. 11C, all the pixels illustrated by the diagonally right lines in FIG. 11B supposed to be cut out as the background cloth 500 are drawn in the gradation of black because the pixels are converted into the depth value indicating infinity. Therefore, in the real space depth image, the boundary between the player 11 and the background cloth 500 can be more finely drawn like the real space color image.

Referring back to FIG. 6, after the processing of converting the depth value of the real space depth image is performed, the processor 111 executes processing of compositing the real space color image and the virtual space color image (S305). Specifically, the depth values of the real space depth image after the processing of S304 and the virtual space depth image having the same resolution as the resolution of the real space depth image are compared on a pixel to pixel basis. Then, the color value of the color image having a smaller depth value is selected as the color value of that pixel. For example, in a case where the depth value of the pixel at the coordinate position (x1, y1) of the real space depth image is "2.0" and the depth value of the pixel at the corresponding coordinate position (x1, y1) in the virtual space depth image is "6.0", the color value of the pixel at the corresponding coordinate position (x1, y1) of the real space color image is adopted as the color value of the pixel at the corresponding coordinate position (x1, y1) of the composite image. On the other hand, in a case where the depth value of the pixel at the coordinate position (x2, y2) of the real space depth image is "infinity (theoretical maximum value)" and the depth of the pixel at the coordinate position (x2, y2) of the virtual space depth image is "1.0", the color value of the pixel at the coordinate position (x2, y2) of the virtual space color image is adopted as the color value of the pixel at the coordinate position (x2, y2) of the composite image. By repeating the above processing for all the pixels, the processing of compositing the real space color image and the virtual space color image is executed.

Figure 12A:
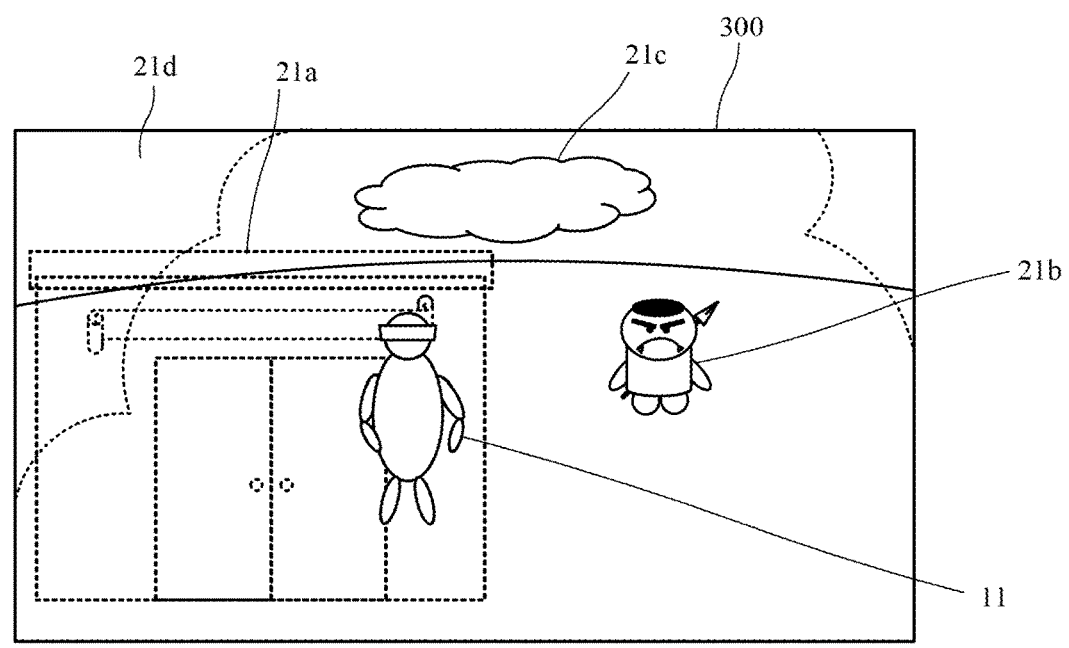
FIG. 12A is a diagram illustrating an example of an image after composite processing according to an embodiment of the present disclosure.

FIG. 12A is a diagram illustrating an example of an image after composite processing according to an embodiment of the present disclosure. Specifically, FIG. 12A illustrates an image after the real space color image and the virtual space color image are composited by the processor 111. By the processing of S302 to S304 of FIG. 6, the depth value of the entire area other than the player 11 is converted into the depth value indicating infinity. That is, in the virtual space illustrated in FIG. 7A, all the virtual objects including the virtual objects 21b to 21d having the depth values corresponding to the distances d3 to d5 always have smaller values than the depth value (infinity) of the area other than the player 11. Therefore, by adopting the color values of the virtual space color image in the area other than the player 11, the virtual objects including all the virtual objects 21b to 21d are drawn.

Meanwhile, in each pixel constituting the player 11, the distance from the real space depth camera 212 is stored as the depth value in pixel units (note that, in FIG. 7B and the like, the description has been made on the assumption that the depth value corresponding to the distance D1 is stored as the representative value). Then, for an area overlapping with the player 11, of the enemy object 21b, the cloud object 21c, and the background object 21d having the depth value larger than the depth value stored in each pixel constituting the player 11, the color value of the real space color image is adopted, whereby the player object of the player 11 is drawn in front. At this time, the building object 21a and the tree object 21x, which are originally arranged in front of the player object of the player 11, are not drawn because the building object 21a and the tree object 21x are non-displayed by the processing of FIG. 5.

Figure 12B:
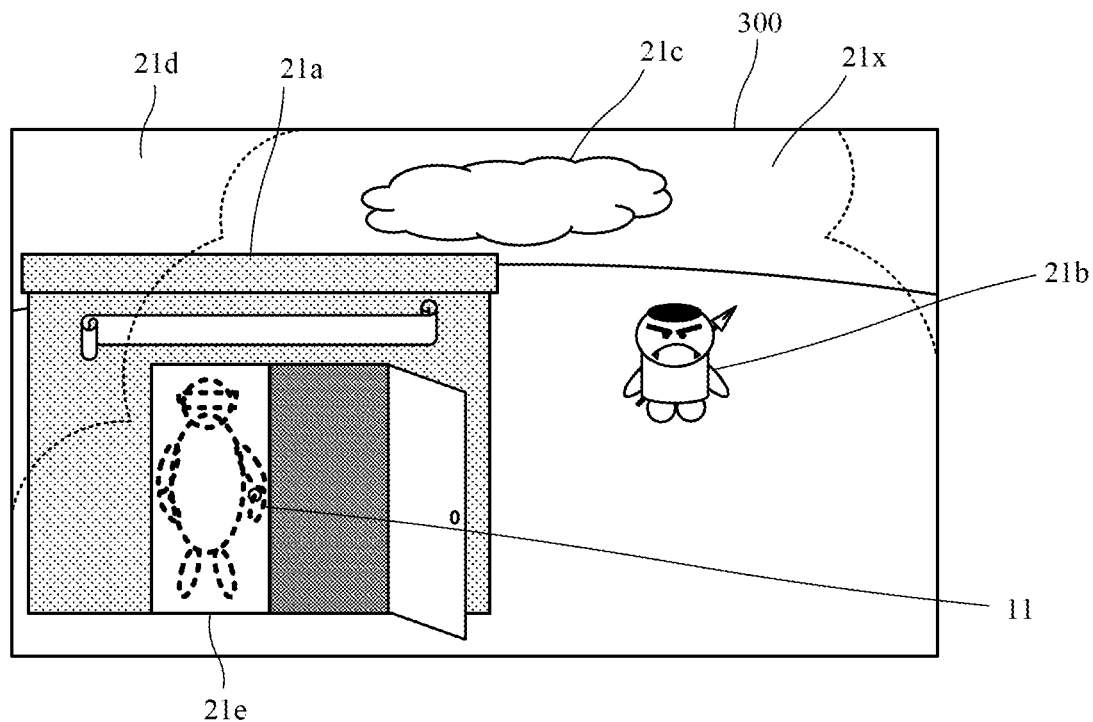
FIG. 12B is a diagram illustrating an example of an image after composite processing according to an embodiment of the present disclosure. Further.

FIG. 12B is a diagram illustrating an example of an image after composite processing according to an embodiment of the present disclosure. Specifically, FIG. 12B illustrates an example of an image in the case where the virtual object is not the non-display target object in the processing of S209 in FIG. 5. According to FIG. 12B, a "door" object 21e is arranged between the player object of the player 11 and the virtual camera in the virtual space. Therefore, the determination of "Yes" is made in S207 of FIG. 5, but since the type information of "door" is set not to be the "non-display target" in advance, determination of "No" is made in S209. That is, the door object is not non-displayed and is arranged in the virtual space as usual, and is captured by the virtual camera 600. Therefore, according to FIG. 12B, the player object of the player 11 positioned behind the door object 21e cannot be visually recognized.

Figure 12C:
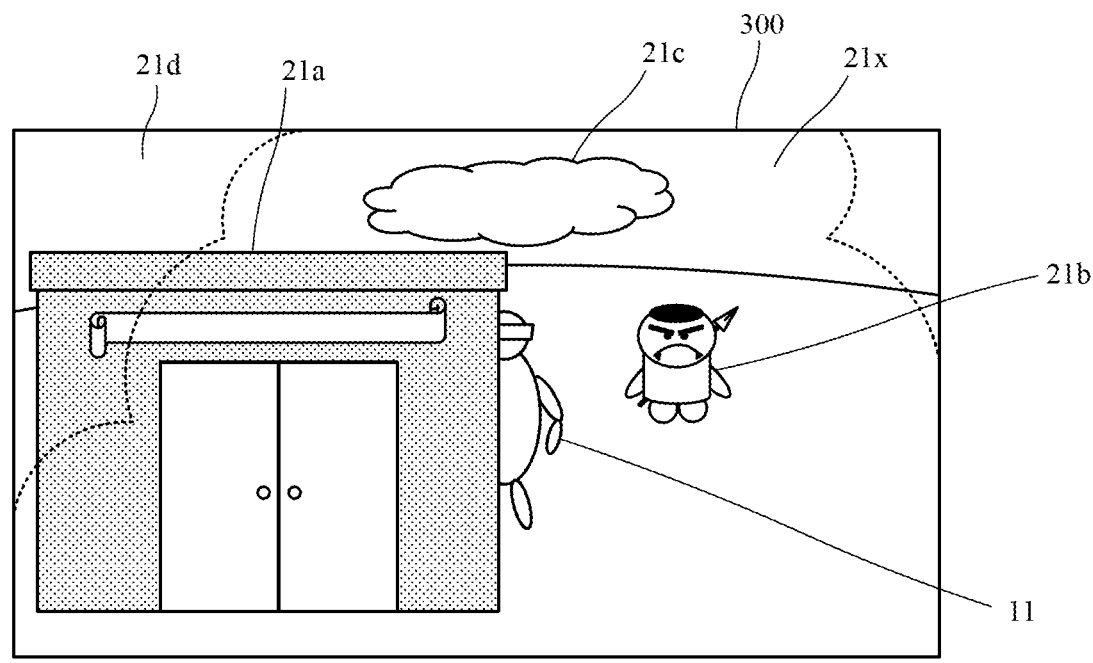
FIG. 12C is a diagram illustrating an example of an image after composite processing according to an embodiment of the present disclosure.

FIG. 12C is a diagram illustrating an example of an image after composite processing according to an embodiment of the present disclosure. Specifically, FIG. 12C illustrates an example of an image in a case where the ratio and the area by which the player arrangement area 23 is covered are smaller than the predetermined ratio and area in the processing of S208 in FIG. 5. According to FIG. 12C, although the building object 21a exists between the player object of the player 11 and the virtual camera in the virtual space, the player object is not completely covered but a part thereof is covered. In this case, determination of "Yes" is made in S207 of FIG. 5, and determination of "No" is made in S208. That is, the building object 21a is not non-displayed and is arranged in the virtual space as usual, and is captured by the virtual camera 600. Therefore, according to FIG. 12C, although a part of the player object of the player 11 positioned behind the building object 21a is displayed in a visually recognizable manner, the remaining portion superimposed with the building object 21a cannot be visually recognized.

As described above, in the present embodiment, the player who is wearing the head mounted display 400 and executing the game application in the virtual space and the virtual space are composited and displayed. Therefore, highly attractive display becomes possible for the third person who is watching the player 11 and his/her operation. Further, the processing of non-displaying the virtual object located between the player object of the player 11 and the virtual camera 600 is performed. Therefore, since the virtual object that hinders the visibility of the player object is not displayed, the third person can more easily view the player object. Further, in the present embodiment, the image of the player 11 is extracted using both the depth value of the real space depth image and the color value of the real space color image. Therefore, highly fine extraction of the player 11 becomes possible than the extraction processing based only on the depth value of the real space depth image. Further, the area where the background cloth 500 is installed can be minimized, as compared with the extraction processing (chroma key compositing processing) using only the color values of the real space color image.

10. Other Embodiments

In the above embodiment, the processing of non-displaying the virtual object between the player object of the player 11 and the virtual camera 600 has been performed in a predetermined case. However, the transmittance of the virtual object may be controlled, and although the virtual object is arranged in the virtual space, the background of the virtual object may be able to be visually recognized, being transmitted through the virtual object, instead of non-display of the virtual object. In such a case, "transmission information" is stored in the virtual object information table in FIG. 3, and the transmission information is appropriately updated. Note that the transmission information is information indicating the degree of transparency of color for each pixel constituting the virtual object, unlike color values of RGB and CMYK stored for each pixel constituting the virtual object. Typically, the degree of transparency is specified with a value called "alpha value" and is expressed by a numerical value ranging from 0 (completely opaque) to 255 (completely transmissive).

Figure 13:
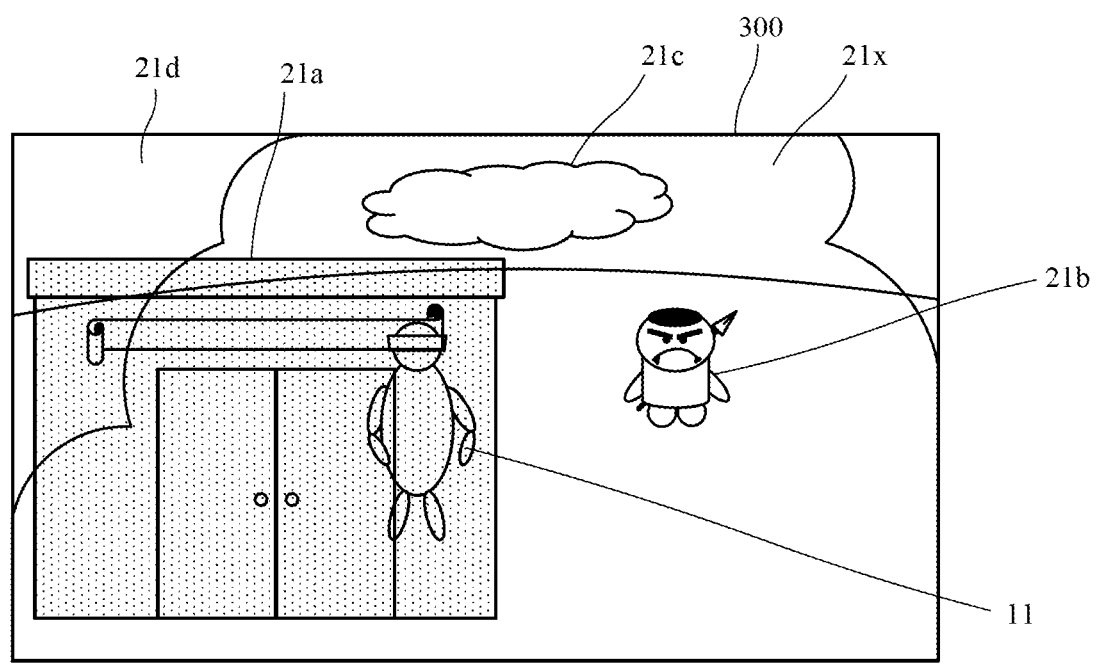
FIG. 13 is a diagram illustrating an example of an image after composite processing according to another embodiment of the present disclosure.

FIG. 13 is a diagram illustrating an example of an image after composite processing according to another embodiment of the present disclosure. Specifically, FIG. 13 illustrates an example of an image in a case where a building object between a player object and a virtual camera 600 is made "translucent" in a virtual space. In this case, since a building object 21a is displayed in a translucent manner, a player object of a player 11 located behind the building object 21a is displayed in a visually recognizable manner. Note that, in the example of FIG. 13, the building object 21a has been made "translucent". However, appropriate adjustment can be performed to make the building object 21a completely transparent by controlling the transmission information stored in FIG. 3.

Further, in the above-described embodiment, the entire building object 21a has been non-displayed or transmitted. However, since each virtual object is controlled for each pixel constituting the virtual object, the entire building object 21a is not necessarily transmitted, and only surroundings of the player object can be non-displayed or transmitted. Further, only a contour portion of the building object 21a may be left and the remaining portion can be non-displayed or transmitted. FIG. 13 illustrates an example of an image of a case where only a contour of a tree object 21x having a distance from the virtual camera 600 being within a predetermined distance in the virtual space is displayed. In this case, the interior of the tree object 21x is made transparent (or transmitted), and its contour is drawn by a solid line so that the existence of the tree object 21x can be visually recognized. Note that the contour is not necessarily drawn by the solid line, and any line type may be used. Also, the entire contour is not necessarily drawn, and only a part of the contour may be drawn.

In the above-described embodiment, the virtual object has been non-displayed only when the entire area is covered in the determination of the ratio or area by which the player arrangement area is covered. However, the present invention is not limited to the example. For example, a virtual object may be non-displayed only when 50% or more of the player object is covered. Note that a ratio or an area serving as a threshold can be appropriately adjusted.

Further, in the above-described embodiment, all the virtual objects that are arranged between the virtual camera 600 and the player object of the player 11 have been the targets for the determination as to whether to non-display the virtual objects. However, the present embodiment is not limited thereto, and only a virtual object included in the angle of view of the virtual camera 600 may be the target for the determination.

Further, in the above embodiment, the processing of S204, S205, S208, and S209 of FIG. 5 has been performed. However, when the positional relationship between the virtual camera 600 or the player object of the player 11 and another virtual object becomes a predetermined positional relationship, processing of uniformly changing a display form may be performed.

In the above embodiment, the case where the composite image is output to the display 300 having a certain size and is viewed by all the third persons has been described. However, each of the third persons may wear head mounted displays and the composite image may be output to the head mounted displays.

Further, in the present embodiment, the case of using the system 1 for execution of the game application has been described. However, the system 1 is also favorably applicable to applications such as medical simulation, driving simulation of automobiles, trains, airplanes, etc., simulation of travel to tourist spots, virtual shopping in virtual shops and virtual real estate, entertainment such as movies and music lives.

The processing and the procedures described in the present specification are not limited to the explicitly described embodiments, and can be realized by software, hardware, or a combination of the software and the hardware. To be specific, the processing and procedures described in the present specification are realized by mounting a logic corresponding to the processing to a medium such as an integrated circuit, a volatile memory, a non-volatile memory, a magnetic disk, or an optical storage. Further, the processing and procedures described in the present specification can be mounted as a computer program and executed by various types of computers including a terminal device and a server device.

Even if description has been given such that the processing and procedures described in the present specification are executed by a single device, software, component, or module, the processing and procedures can be executed by a plurality of devices, pieces of software, components, or modules. Further, even if description has been given such that the various types of information described in the present specification are stored in a single memory or storage unit, such information can be distributed and stored in a plurality of memories included in a single device or a plurality of memories distributed and arranged in a plurality of devices. Further, the elements of software and hardware described in the present specification can be realized by being integrated into a smaller number of configuration elements or by being decomposed into a larger number of configuration elements.

The terminal device, system, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A terminal device comprising:
an interface configured to communicate with an external device, the external device including a real space camera located in a real space, the real space camera having an image sensor and a depth sensor;
a memory configured to store computer-readable instructions, a first virtual object, and a second virtual object different from the first virtual object, the first virtual object being operable based on an instruction input by a real player in the real space; and
a processor configured to execute the computer-readable instructions so as to:
obtain an image object of the real player in response to an image captured by the real space camera, the image object having a depth value, the depth value corresponding to a distance between the real space camera and the real player in the real space;
obtain a virtual space image including the first and second virtual objects, the virtual space image being virtually captured by a virtual camera in a virtual space, the real space camera being located in the real space at a position corresponding to a position of the virtual camera in the virtual space, the first virtual object corresponding to the image object of the real player, the first virtual object being obtained by extracting the image object of the real player from the image captured by the real space camera in response to the depth value;
recognize a positional relationship between the second virtual object and one of the first virtual object and the virtual camera in the virtual space; and
change a display form of the second virtual object, when the positional relationship is a first predetermined positional relationship,
wherein, when the second virtual object is arranged within a predetermined distance from the virtual camera in the virtual space and the first virtual object is arranged outside of the predetermined distance from the virtual camera in the virtual space, the display form of the second virtual object is changed, and
wherein, when the first and second virtual objects are arranged outside of the predetermined distance from the virtual camera in the virtual space and the positional relationship between the first virtual object and the second virtual object is the first predetermined positional relationship in the virtual space, the display form of the second virtual object is changed.

2. The terminal device according to claim 1,
wherein the external device includes a display, and
wherein the processor is further configured to:
identify the virtual space in which the first and second virtual objects and the virtual camera are provided;
recognize first, second, and third positions of the first and second virtual objects and the virtual camera in the virtual space, respectively; and
display the first object at a corresponding position of the first position in the display and selectively display the second object in the changed display form at a corresponding position of the second position in the display,
wherein the processor is configured to recognize the positional relationship between the second position of the second virtual object and one of the first position of the first virtual object and the third position of the virtual camera in the virtual space.

3. The terminal device according to claim 2,
wherein the changed display form is transparent and the second virtual object in the changed display form is not displayed in the display in a viewable state.

4. The terminal device according to claim 1,
wherein the first predetermined positional relationship is at least one of a case in which the second virtual object is arranged on a line connecting between the virtual camera and the first virtual object and a case in which the second virtual object is arranged within the predetermined distance from the virtual camera.

5. The terminal device according to claim 1,
wherein a head mounted display is wearable by the real player, and the head mounted display is configured to display the virtual space.

6. The terminal device according to claim 1,
wherein the processor is configured to change the display form of the second virtual object, when the positional relationship satisfies the first predetermined positional relationship and a second predetermined positional relationship,
wherein, when the first and second virtual objects are arranged outside of the predetermined distance from the virtual camera in the virtual space and the positional relationship between the first virtual object and the second virtual object satisfies the first and second predetermined positional relationships in the virtual space, the changed display form is translucent and the second virtual object in the changed display form is displayed in a viewable overlapped state in which the second virtual object is overlapped with the first virtual object.

7. The terminal device according to claim 1,
wherein the processor is configured to change the display form of the second virtual object when the positional relationship satisfies the first predetermined positional relationship and a second predetermined positional relationship,
wherein, when the first and second virtual objects are arranged outside of the predetermined distance from the virtual camera in the virtual space and the positional relationship between the first virtual object and the second virtual object satisfies the first and second predetermined positional relationships in the virtual space, the changed display form is an incomplete display form and a first part of contours of the second virtual object in the changed display form is displayed in a viewable state and a second part of the contours of the second virtual object in the changed display form is not displayed in the viewable state.

8. The terminal device according to claim 1,
wherein the memory is configured to store attribute information of the second virtual object, and
the processor is configured to determine whether the display form of the second virtual object is changed based on the attribute information in addition to the positional relationship.

9. The terminal device according to claim 8,
wherein the attribute information includes at least one of type information and shape information of the second virtual object.

10. The terminal device according to claim 1,
wherein the positional relationship is a case in which at least a part of the second virtual object is overlapped with the first virtual object in the virtual space image captured by the virtual camera.

11. The terminal device according to claim 1,
wherein the positional relationship is a case in which the second virtual object is overlapped with an entirety of the first virtual object in the virtual space image captured by the virtual camera.

12. A system comprising:
a terminal device, the terminal device including:
an interface;
a memory configured to store computer-readable instructions, a first virtual object, and a second virtual object different from the first virtual object, the first virtual object being operable based on an instruction input by a real player in a real space; and
a processor configured to execute the computer-readable instructions;
a real space camera arranged in the real space, the real space camera being configured to be communicatively connected with the terminal device via the interface, the real space camera being configured to capture an image of the real player in the real space, the real space camera having an image sensor and a depth sensor; and
a display configured to be communicatively connected with the terminal device via the interface and configured to display a virtual space image including the first virtual object and the second virtual object, the virtual space image being virtually captured by a virtual camera in a virtual space, the real space camera being located in the real space at a position corresponding to a position of the virtual camera in the virtual space, the first virtual object corresponding to the image object of the real player,
wherein the processor is configured to:
obtain an image object of the real player in response to the image captured by the real space camera, the image object having a depth value, the depth value corresponding to a distance between the real space camera and the real player in the real space;
obtain the virtual space image;
obtain the first virtual object by extracting the image object of the real player from the image captured by the real space camera in response to the depth value;
recognize a positional relationship between the second virtual object and one of the first virtual object and the virtual camera in the virtual space; and
change a display form of the second virtual object, when the positional relationship is a predetermined positional relationship,
wherein, when the second virtual object is arranged within a predetermined distance from the virtual camera in the virtual space and the first virtual object is arranged outside of the predetermined distance from the virtual camera in the virtual space, the display form of the second virtual object is changed, and
wherein, when the first and second virtual objects are arranged outside of the predetermined distance from the virtual camera in the virtual space and the positional relationship between the first virtual object and the second virtual object is the predetermined positional relationship in the virtual space, the display form of the second virtual object is changed.

13. The system according to claim 12,
wherein the processor is further configured to:
identify the virtual space in which the first and second virtual objects and the virtual camera are provided;
recognize first, second, and third positions of the first and second virtual objects and the virtual camera in the virtual space, respectively; and
display the first object at a corresponding position of the first position in the display and selectively display the second object in the changed display form at a corresponding position of the second position in the display,
wherein the processor is configured to recognize the positional relationship between the second position of the second virtual object and one of the first position of the first virtual object and the third position of the virtual camera in the virtual space.

14. A non-transitory computer-readable storage medium having computer-readable instructions for causing a computer to execute a process by a processor, the computer including a memory configured to store a first virtual object and a second virtual object different from the first virtual object, the first virtual object being operable based on an instruction input by a real player in a real space, the computer configured to perform steps of:
obtaining an image object of the real player in response to an image captured by a real space camera having an image sensor and a depth sensor, the image object having a depth value, the depth value corresponding to a distance between the real space camera and the real player in the real space;
obtaining a virtual space image including the first and second virtual objects, the virtual space image being virtually captured by a virtual camera in a virtual space, the real space camera being located in the real space at a position corresponding to a position of the virtual camera in the virtual space, the first virtual object corresponding to the image object of the real player, the first virtual object being obtained by extracting the image object of the real player from the image captured by the real space camera in response to the depth value;
recognizing a positional relationship between the second virtual object and one of the first virtual object and the virtual camera in the virtual space; and
changing a display form of the second virtual object, when the positional relationship is a predetermined positional relationship,
wherein, when the second virtual object is arranged within a predetermined distance from the virtual camera in the virtual space and the first virtual object is arranged outside of the predetermined distance from the virtual camera in the virtual space, the display form of the second virtual object is changed, and
wherein, when the first and second virtual objects are arranged outside of the predetermined distance from the virtual camera in the virtual space and the positional relationship between the first virtual object and the second virtual object is the predetermined positional relationship in the virtual space, the display form of the second virtual object is changed.

15. The non-transitory computer-readable storage medium according to claim 14,
wherein the computer is further configured to perform the steps of:
identifying the virtual space in which the first and second virtual objects and the virtual camera are provided;
recognizing first, second, and third positions of the first and second virtual objects and the virtual camera in the virtual space, respectively; and
displaying the first object at a corresponding position of the first position in a display and selectively display the second object in the changed display form at a corresponding position of the second position in the display,
wherein the processor is configured to recognize the positional relationship between the second position of the second virtual object and one of the first position of the first virtual object and the third position of the virtual camera in the virtual space.

16. A method for causing a processor in a computer to execute a process, the computer including a memory configured to store computer-readable instructions and first and second virtual objects different from each other, the first virtual object being operable based on an instruction input by a real player in a real space, the method comprising executing the computer-readable instructions on the processor steps of:
obtaining an image object of the real player in response to an image captured by a real space camera having an image sensor and a depth sensor, the real space camera being located in the real space, the image object having a depth value, the depth value corresponding to a distance between the real space camera and the real player in the real space;
obtaining a virtual space image including the first and second virtual objects, the virtual space image being virtually captured by a virtual camera in a virtual space, the real space camera being located in the real space at a position corresponding to a position of the virtual camera in the virtual space, the first virtual object corresponding to the image object of the real player, the first virtual object being obtained by extracting the image object of the real player from the image captured by the real space camera in response to the depth value;
recognizing a positional relationship between the second virtual object and one of the first virtual object and the virtual camera in the virtual space; and
changing a display form of the second virtual object, when the positional relationship is a predetermined positional relationship,
wherein, when the second virtual object is arranged within a predetermined distance from the virtual camera in the virtual space and the first virtual object is arranged outside of the predetermined distance from the virtual camera in the virtual space, the display form of the second virtual object is changed, and
wherein, when the first and second virtual objects are arranged outside of the predetermined distance from the virtual camera in the virtual space and the positional relationship between the first virtual object and the second virtual object is the predetermined positional relationship in the virtual space, the display form of the second virtual object is changed.

17. The method according to claim 16,
wherein the computer is further configured to the steps of:
identifying the virtual space in which the first and second virtual objects and the virtual camera are provided;
recognizing first, second, and third positions of the first and second virtual objects and the virtual camera in the virtual space, respectively; and
displaying the first object at a corresponding position of the first position in a display and selectively display the second object in the changed display form at a corresponding position of the second position in the display,
wherein the processor is configured to recognize the positional relationship between the second position of the second virtual object and one of the first position of the first virtual object and the third position of the virtual camera in the virtual space.

* * * * *